US009189133B2

(12) United States Patent
Ubillos

(10) Patent No.: US 9,189,133 B2
(45) Date of Patent: *Nov. 17, 2015

(54) METHOD AND APPARATUS FOR DYNAMICALLY RESIZING WINDOWS

(75) Inventor: Randy Ubillos, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 1271 days.

This patent is subject to a terminal disclaimer.

(21) Appl. No.: 13/018,404

(22) Filed: Jan. 31, 2011

(65) Prior Publication Data

US 2011/0173566 A1 Jul. 14, 2011

Related U.S. Application Data

(63) Continuation of application No. 12/277,292, filed on Nov. 24, 2008, now Pat. No. 7,904,832, which is a continuation of application No. 10/408,787, filed on Apr. 6, 2003, now Pat. No. 7,480,872.

(51) Int. Cl.
*G06F 3/048* (2013.01)
*G06F 3/0483* (2013.01)

(52) U.S. Cl.
CPC .................................. *G06F 3/0483* (2013.01)

(58) Field of Classification Search
CPC .................................. G06F 3/00; G06F 3/048
USPC ........... 715/716–723, 798, 800, 838; 370/225
See application file for complete search history.

(56) References Cited

U.S. PATENT DOCUMENTS

| 5,237,648 | A | | 8/1993 | Mills et al. |
| 5,528,744 | A | | 6/1996 | Vaughton |
| 5,694,561 | A | | 12/1997 | Malamud et al. |
| 5,712,995 | A | * | 1/1998 | Cohn .......................... 715/792 |
| 6,008,809 | A | | 12/1999 | Brooks |
| 6,061,061 | A | | 5/2000 | Conrad et al. |
| 7,480,872 | B1 | | 1/2009 | Ubillos |
| 7,904,832 | B2 | | 3/2011 | Ubillos |

OTHER PUBLICATIONS

U.S. Appl. No. 10/408,787, filed Dec. 15, 2008, Ubilos, Randy.
U.S. Appl. No. 12/277,292, filed Feb. 3, 2011, Ubilos, Randy.

* cited by examiner

*Primary Examiner* — Peiyong Weng
*Assistant Examiner* — Truc Chuong
(74) *Attorney, Agent, or Firm* — Schwegman Lundberg & Woessner, P.A.

(57) ABSTRACT

The present invention provides a method for resizing windows and an apparatus for resizing windows. The method, in one embodiment, involves selecting a seam bordering a window, building a list of windows, and resizing more than one window in response to a single seam movement by a user. The apparatus, in one embodiment, is a computer readable medium comprising a computer program for resizing windows.

25 Claims, 27 Drawing Sheets

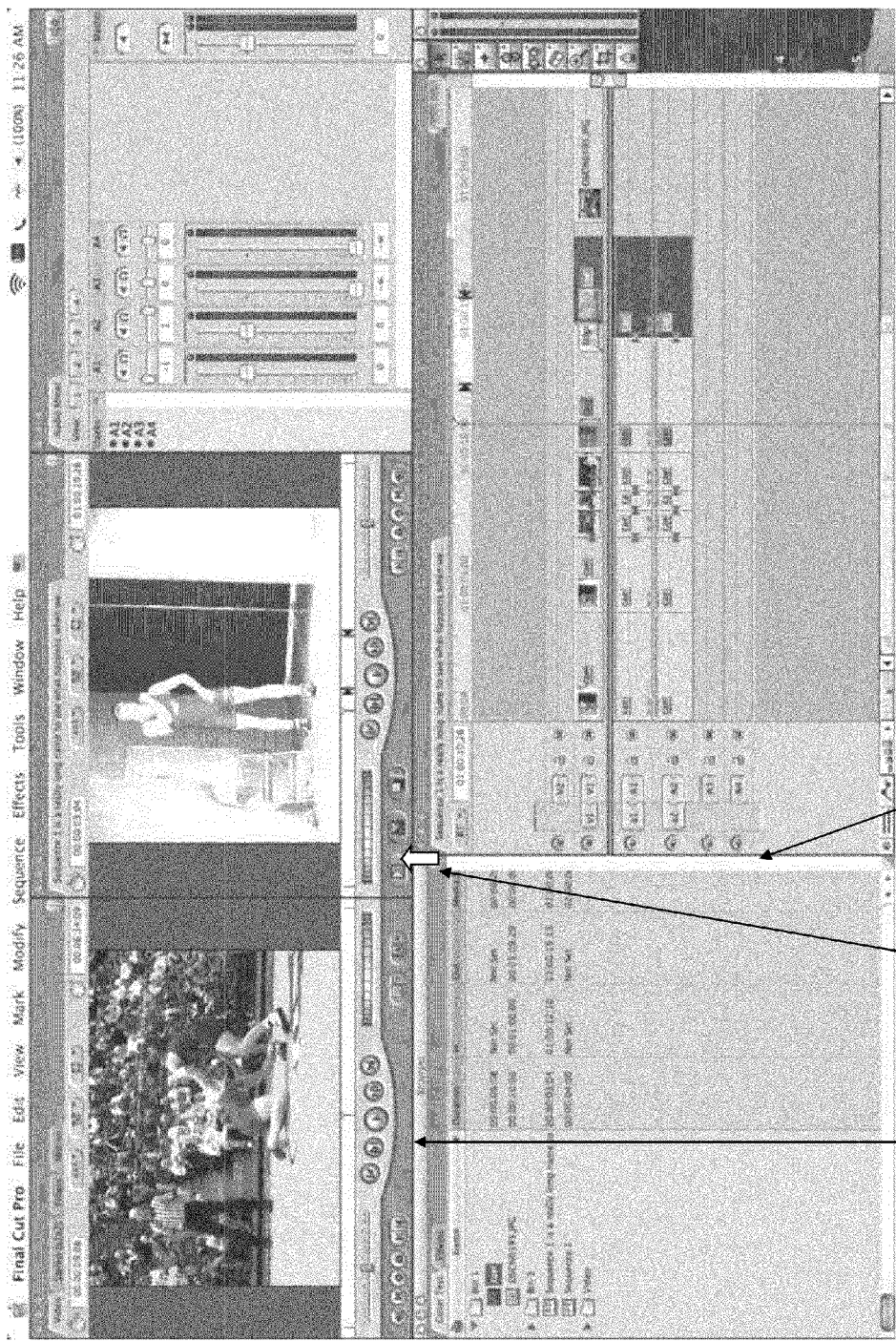

METHOD AND APPARATUS FOR DYNAMICALLY RESIZING WINDOWS

CLAIM OF BENEFIT TO PRIOR APPLICATIONS

This application is a continuation application of U.S. patent application Ser. No. 12/277,292, filed Nov. 24, 2008, now U.S. Pat. No. 7,904,832 now published as U.S. Publication 2009/0144653. U.S. patent application Ser. No. 12/277,292 is a continuation application of U.S. patent application Ser. No. 10/408,787, filed Apr. 6, 2003, now issued as U.S. Pat. No. 7,480,872. U.S. Publication 2009/0144653 and U.S. Pat. No. 7,480,872 are incorporated herein by reference.

FIELD OF THE INVENTION

The present invention concerns the field of graphical user interfaces for computer systems. Specifically, the invention is directed towards methods and apparatus for resizing windows.

BACKGROUND OF THE INVENTION

Oftentimes, when working in a single computer application, or among several, it is desirable to resize more than one user interface window at the same time. This is especially true for computer applications that use multiple different windows to present information to the user. For example, professional video editing applications such as Apple Computer's Final Cut Pro provides an editor to integrate video and audio clips, as well as add in special effects to a presentation, each of which is represented by a different window of the graphical user interface. The presence of several different windows that must be coordinated with one another makes individual movement and resizing of the windows time consuming and tedious. Therefore, there is a need for a method that allows the simultaneous movement and/or resizing of several windows.

SUMMARY OF THE INVENTION

The present invention provides a method for resizing windows. In some embodiments of the invention, a method for resizing windows is provided, where the method involves the following steps: selecting a seam bordering at least one window; building a list of at least three windows, where the list contains the window bordering the selected seam; and, resizing at least three windows on the list in response to movement of the seam by a user.

In other embodiments of the invention, a method for resizing windows is provided, where the method involves the following steps: selecting a seam bordering at least one window; building a list of windows, where the list contains the window bordering the selected seam; and, resizing at least one window on the list in response to movement of the seam by a user, where the window contains a display, and where the aspect ratio of the display is maintained after resizing.

In other embodiments of the invention, a method for resizing windows is provided, where the method involves the following steps: selecting a seam bordering at least one window; building a list of at least two windows, where the list contains the window bordering the selected seam; and, resizing at least a first and second window on the list in response to movement of the seam by a user, wherein the first window has a predefined relationship with the second window, and where the predefined relationship provides that the resizing of the second window is proportional to the resizing of the first window.

In other embodiments of the invention, a method for resizing windows is provided, where the method involves the following steps: selecting a seam bordering at least one window; building a list of at least two windows, where the list contains the window bordering the selected seam; and, resizing at least one window on the list while moving a non-resizable window on the list in response to movement of the seam by a user.

The present invention also provides an apparatus for resizing windows. In some embodiments of the invention, the apparatus is a computer readable medium comprising a computer program for resizing windows. The computer program comprises sets of instructions for: selecting a seam bordering at least one window; building a list of at least three windows, where the list contains the window bordering the selected seam; and, resizing at least three windows on the list in response to movement of the seam by a user.

In other embodiments of the invention, the computer program of the computer readable medium comprises sets of instructions for: selecting a seam bordering at least one window; building a list of windows, where the list contains the window bordering the selected seam; and, resizing at least one window on the list in response to movement of the seam by a user, where the window contains a display, and where the aspect ratio of the display is maintained after resizing.

In other embodiments of the invention, the computer program of the computer readable medium comprises sets of instructions for: selecting a seam bordering at least one window; building a list of at least two windows, where the list contains the window bordering the selected seam; and, resizing at least a first and second window on the list in response to movement of the seam by a user, wherein the first window has a predefined relationship with the second window, and where the predefined relationship provides that the resizing of the second window is proportional to the resizing of the first window.

In other embodiments of the invention, the computer program of the computer readable medium comprises sets of instructions for: selecting a seam bordering at least one window; building a list of at least two windows, where the list contains the window bordering the selected seam; and, resizing at least one window on the list while moving a non-resizable window on the list in response to movement of the seam by a user.

BRIEF DESCRIPTION OF THE DRAWINGS

FIG. 8B illustrates a modification of FIG. 8A, where a seam is selected by placing and activating a cursor over the top of two intersecting seams and subsequently moved.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail. The present invention will be described with reference to a video editing program, however, the graphical user interface teachings of the present invention may be used in any application.

The invention provides a method for dynamically resizing computer windows. In this case, "dynamically resizing" refers to the resizing of more than one window through a single action, such as the activation and dragging of a cursor. This is in contrast to typical window resizing events, where a single action simply alters the size of a single window.

Figure 1A:
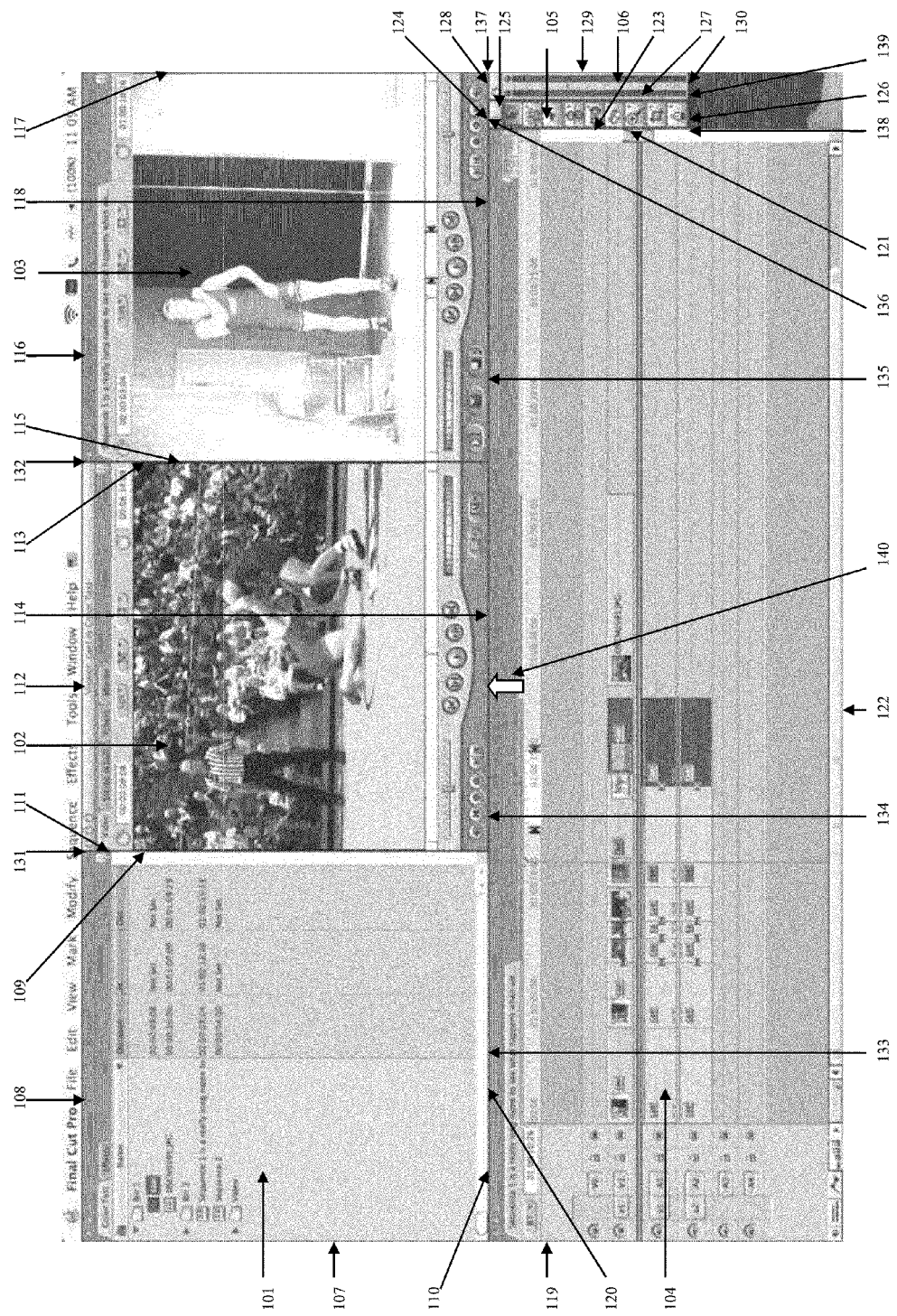
FIG. 1A illustrates one embodiment of the invention involving a graphical user interface containing six different windows.

An embodiment of the invention is illustrated in reference to the Figures, which depict screens and window manipulations within FINAL CUT PRO, a professional nonlinear video editor. FIG. 1A illustrates a graphical user interface ("GUI") 100 consisting of six different user interface windows: Browser window 101 which possesses sides 107, 108, 109, and 110; Viewer window 102 which possesses sides 111, 112, 113, and 114; Canvas window 103 which contains sides 115, 116, 117, and 118; the Timeline window 104 which possesses sides 119, 120, 121, and 122; Palette 105 which possesses sides 123, 124, 125 and 126; and, Palette 106 which possesses sides 127, 128, 129, and 130.

Seams exist where any sides of two different windows come into contact with one another. For instance, the following seams are shown as dark lines between windows: the dark line between side 109 and side 111 is seam 131; the dark line between side 113 and side 115 is seam 132; the dark line between 110 and 120 is seam 133; the dark line between side 114 and side 120 is scam 134; the dark line between side 118 and side 120 is seam 135; the dark line between side 118 and side 124 is seam 136; the dark line between side 118 and side 128 is seam 137; the dark line between side 121 and side 123 is seam 138; and, the dark line between side 125 and side 127 is seam 139.

The sizes of the various windows may be adjusted by using a cursor controlled by a cursor control device such as a computer mouse. In FIG. 1A, a cursor 140 is position over seam 134 located between viewer window 102 and timeline window 104.

Figure 1B:
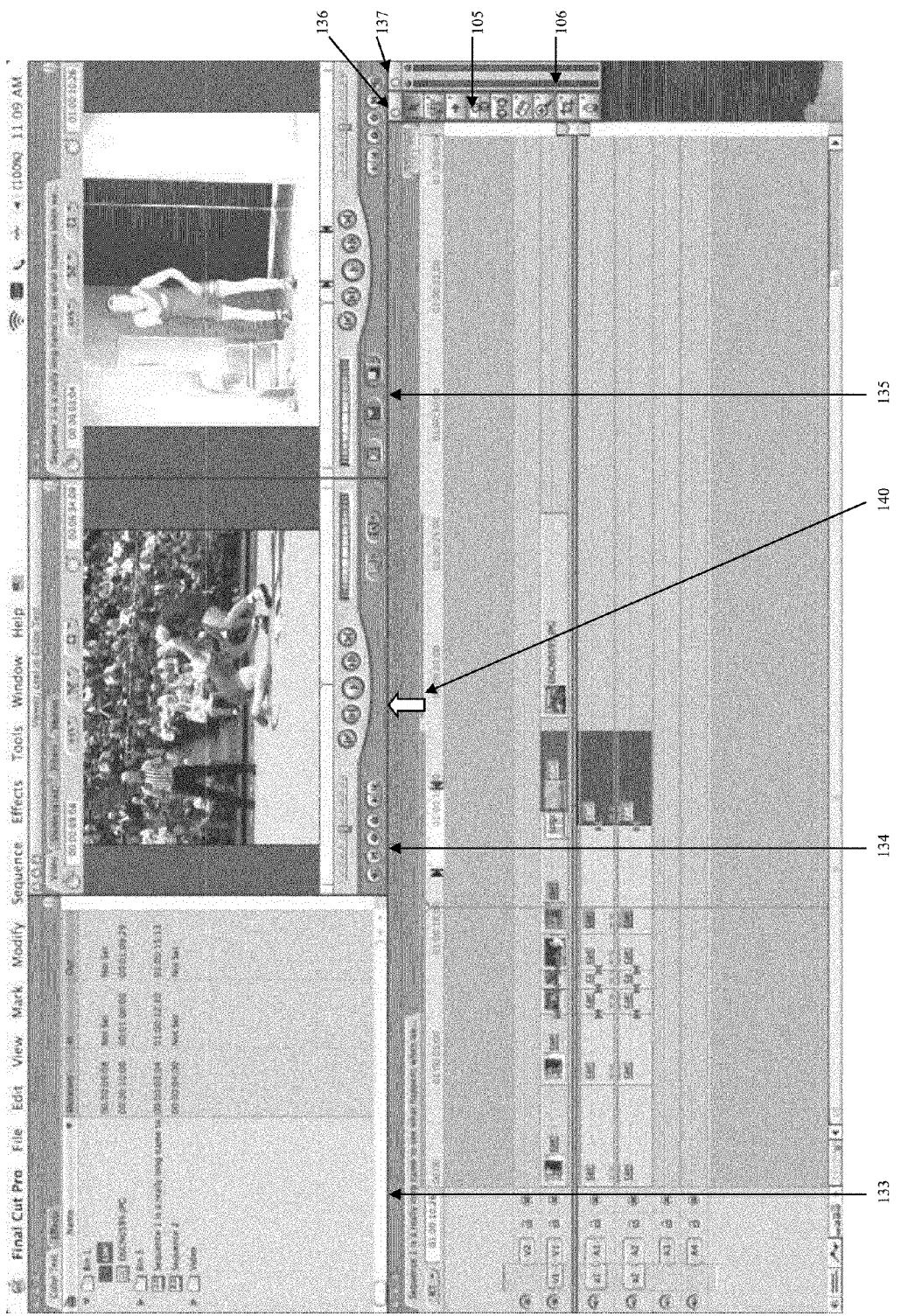
FIG. 1B illustrates a modification of FIG. 1A, where more than one window has been resized as the result of a single cursor movement. It further illustrates a rule whereby a display in a resized window maintains a predefined aspect ratio.

FIG. 1B is a modification of FIG. 1A, where cursor 140 has been activated by a mouse click to select seam 134 and subsequently dragged upward. Seam 134 is moved upward, as are contiguous seams 133, 135, 136, and 137. In this particular embodiment of the invention, where a selected seam is contiguous with another seam or seams, movement of the selected seam effects equivalent movement in the contiguous seam(s).

Certain window data and windows are treated in a special manner. Specifically, a rule may specify if the aspect ratio of data within a window must be kept consistent. For example, there is a rule that maintains the aspect ratio—4:3 aspect ratio in this case—of the data displays within Viewer window 102 and Canvas window 103 despite resizing. Other windows, such as Palettes 105 and 106, cannot be changed in size. Based on the movement of scams 136 and 137, Palettes 105 and 106 were moved upward, but not vertically expanded. This is due to a rule that defines palettes as non-resizable windows. In other words, the shape and size of palettes is maintained even though an adjacent seam is selected and dragged.

Figure 1C:
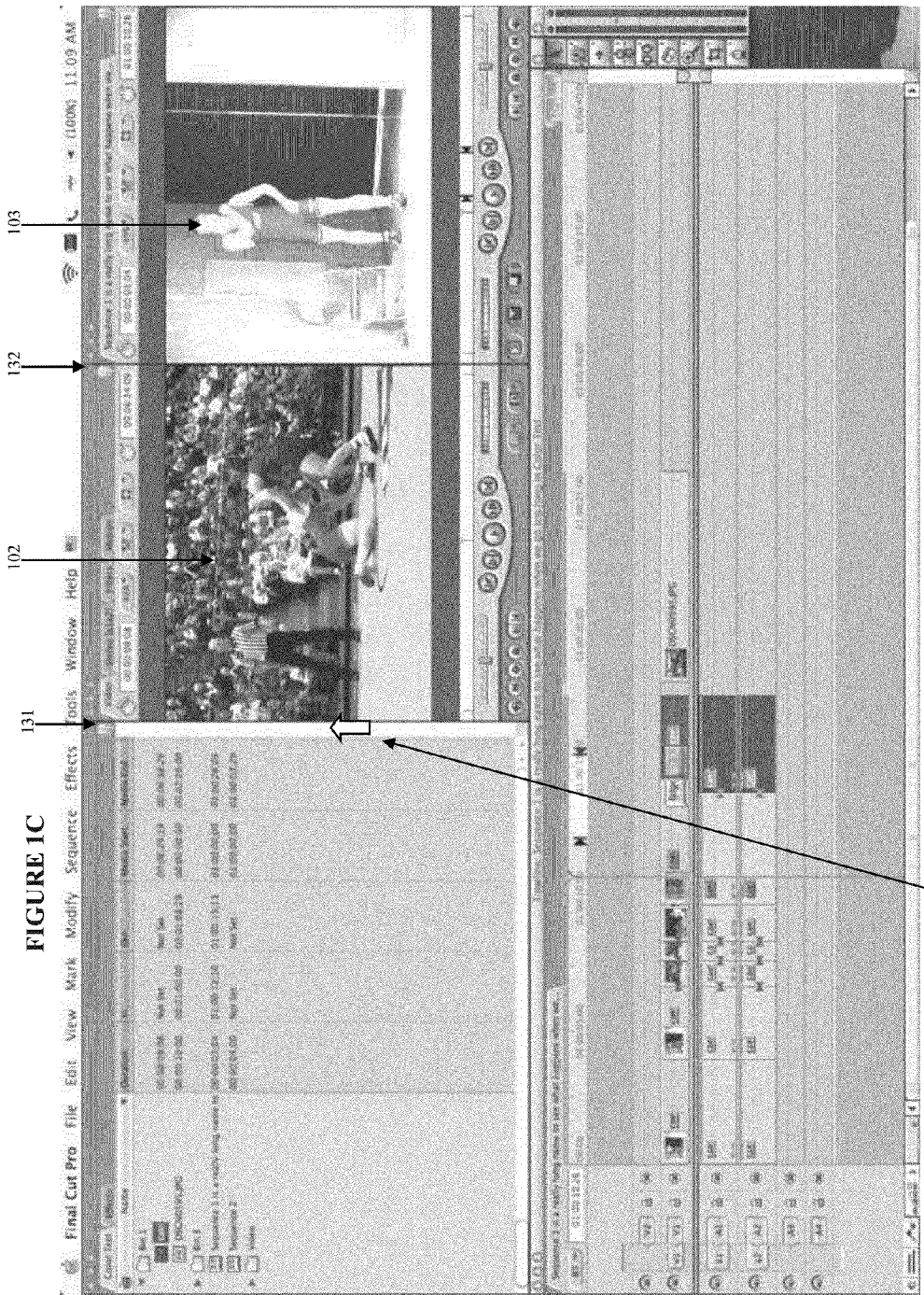
FIG. 1C illustrates a modification of FIG. 1A, where the size ratio of two windows is maintained during a resizing operation due to a predefined relationship, even though only a seam bordering one of the windows was moved.

The size ratios of different windows may be locked such that any resizing of one window will affect the other window. For example, referring back to FIG. 1A, Viewer window 102 and Canvas window 103 may be locked to each other. Thus, if cursor 140 was first placed on seam 131, then activated by a mouse click, and finally dragged to the right, the final output will appear as illustrated in FIG. 1C. Specifically, both seam 131 and seam 132 were moved in the process, which was due to the predefined window relationship between Viewer window 102 and Canvas window 103. The window relationship ensures that the size ratio of Viewer window 102 to Canvas window 103 is maintained. Resizing Viewer window 102 accordingly resulted in the equivalent resizing of Canvas 103.

Figure 2A:
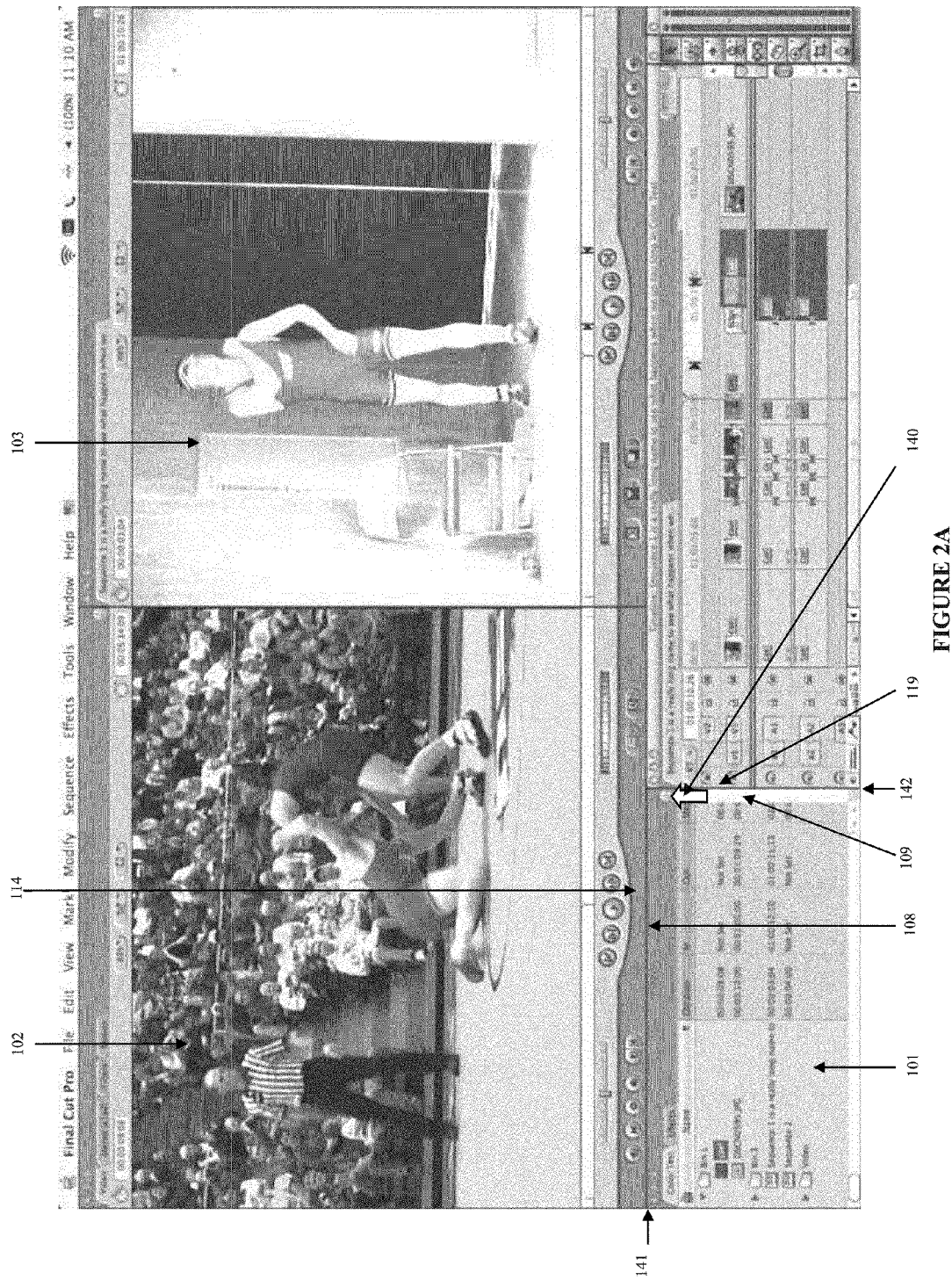
FIG. 2A illustrates one embodiment of the invention involving a graphical user interface containing six different windows.

FIG. 2A illustrates another embodiment of a graphical user interface consisting of the same six windows as described in FIG. 1A. The primary difference is that Browser window 101 has been moved downward into the bottom row of windows, and Viewer window 102 and Canvas window 103 have been expanded to fill the top row of windows. For the purposes of describing this figure, elements are numbered the same as for FIG. 1A, except that the dark line between Browser window side 108 and Viewer window side 114 is seam 141, and the dark line between Browser window side 109 and Timeline window side 119 is seam 142. Cursor 140 is over seam 142.

Figure 2B:
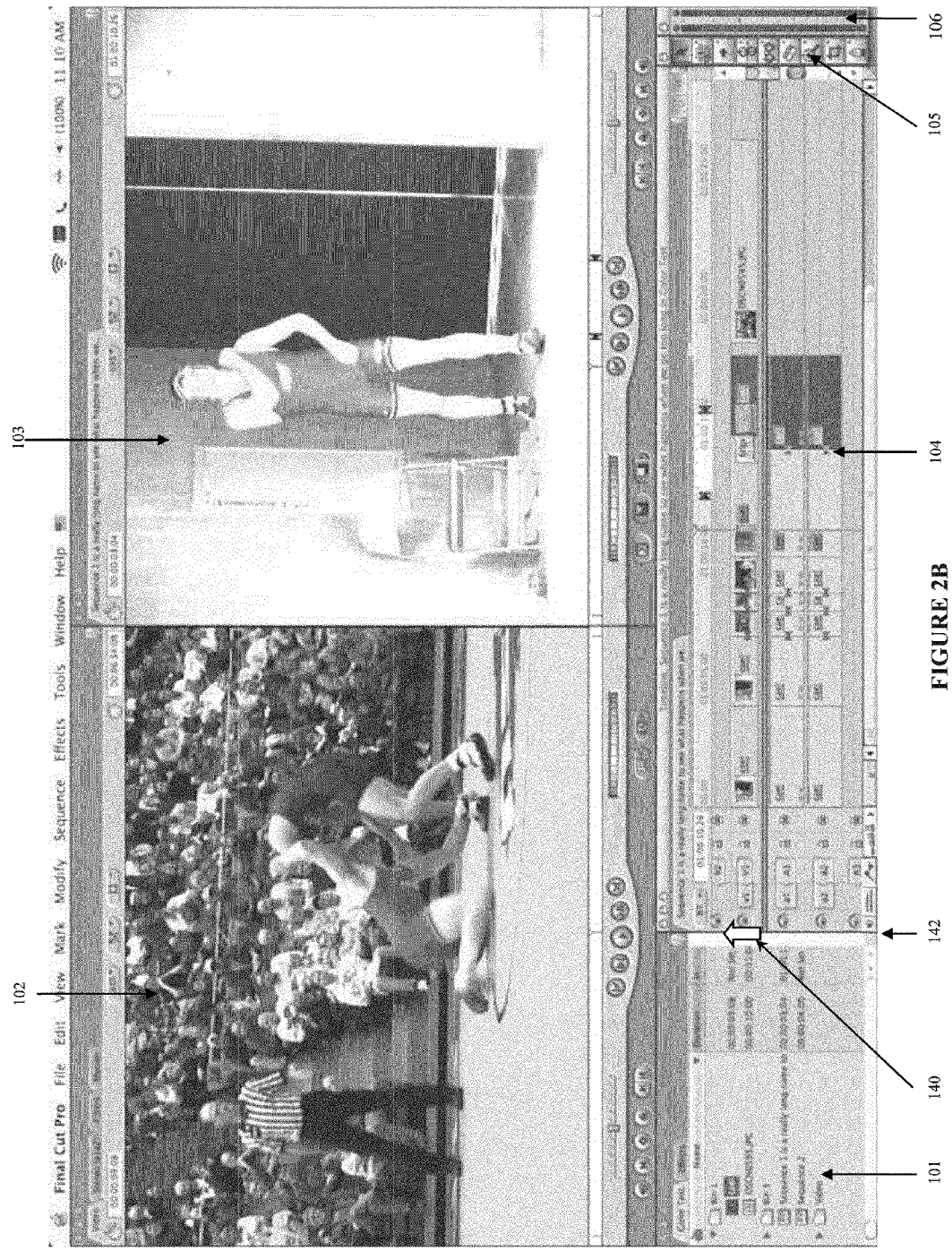
FIG. 2B illustrates a modification of FIG. 2A, where non-resizable windows (i.e., palettes) are moved but not resized.

Nonresizeable windows cannot be placed into locked aspect ratio relationships. For example, FIG. 2B is a modification of FIG. 2A, where cursor 140 has been placed on seam 142, activated by a mouse click, and subsequently dragged to the left. The dragging motion resulted in the leftward movement of seam 142, thereby expanding the width of Timeline window 104 and contracting the width of Browser 101. However, Palettes 105 and 106 neither moved nor changed shape. Furthermore, neither the width nor height of either Viewer window 102 or Canvas window 103 was affected by the movement of seam 142 since seam 142 is not shared with either of those windows.

Figure 3A:
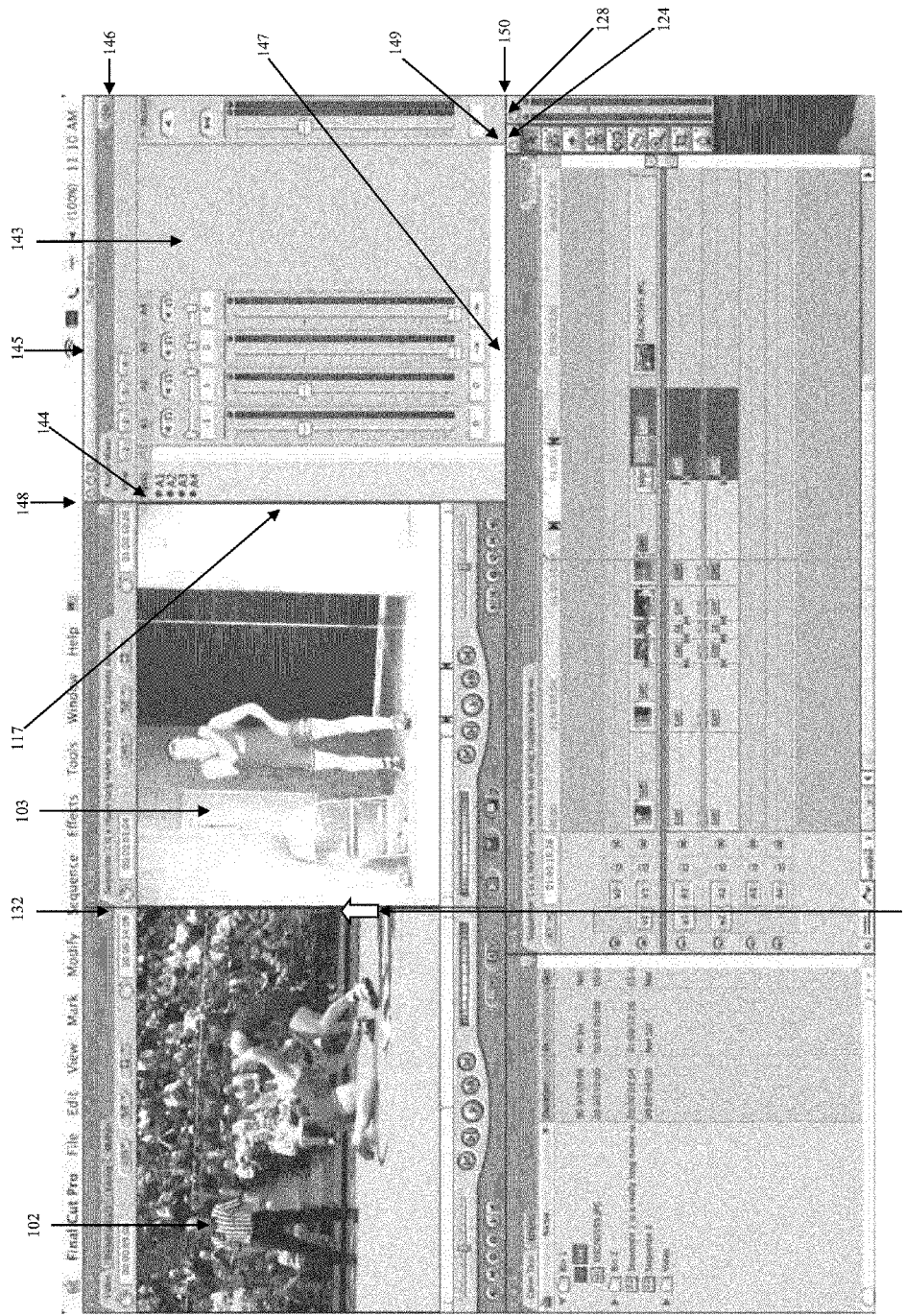
FIG. 3A illustrates one embodiment of the invention involving a graphical user interface containing seven different windows.

FIG. 3A illustrates a graphical user interface consisting of 7 different windows. Six of the windows are the same as for FIG. 2A. Tool Bench window 143 has been added to the upper row of windows. Tool Bench window 143 has sides 144, 145, 146, and 147. The dark line between Tool Bench side 144 and Canvas side 117 is seam 148; the dark line between Tool Bench side 147 and Palette side 124 is seam 149; and, the dark line between Tool Bench side 147 and Palette side 128 is seam 150. Cursor 140 is over top of seam 132.

Figure 3B:
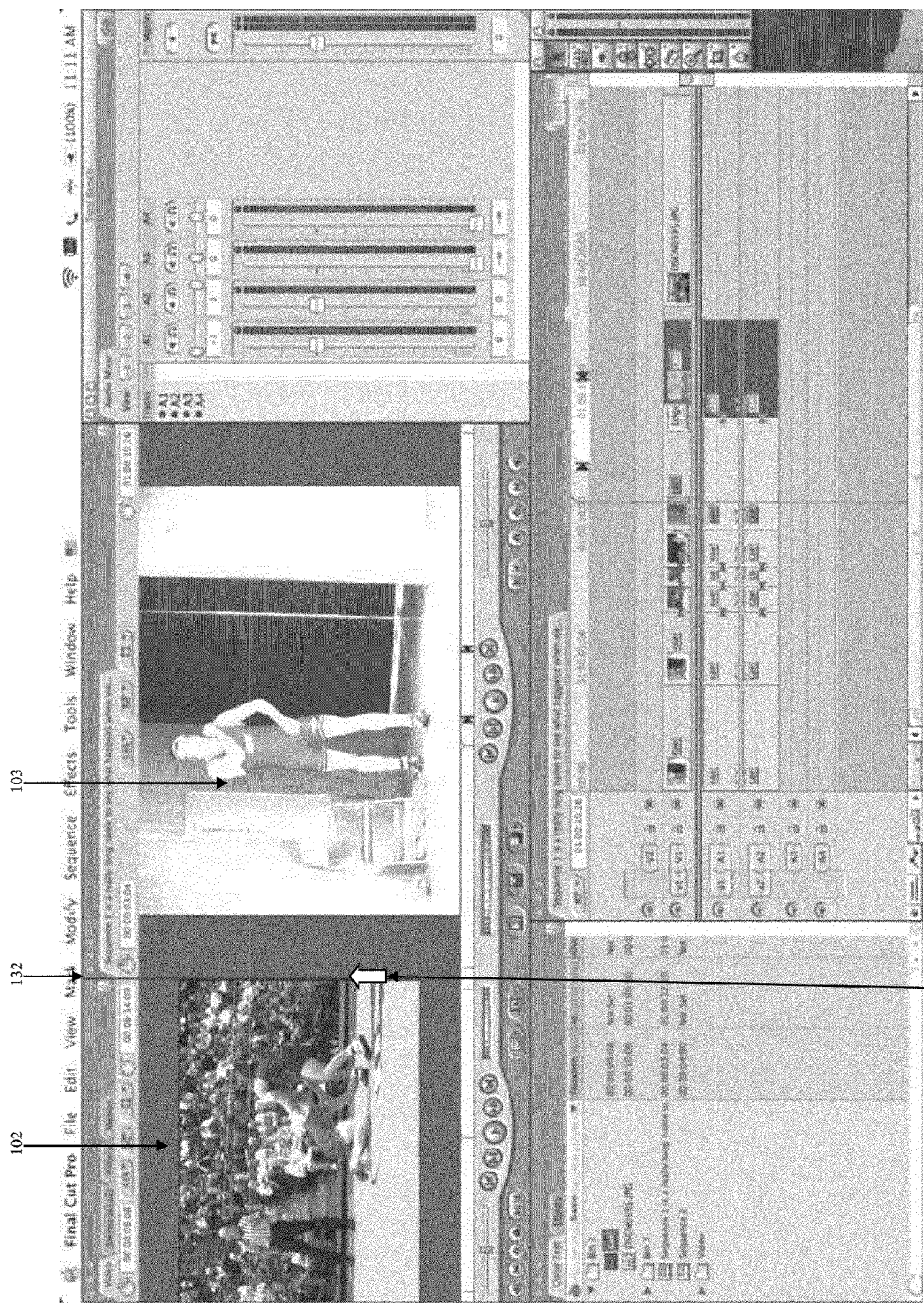
FIG. 3B illustrates a modification of FIG. 3A, where a predefined size relationship between two windows is redefined. It further illustrates that there is a preset minimum size for windows.

Locked size ratio relationships may be modified by adjusting a common seam between two windows with a locked size ratio relationship. As previously set forth, there may be a lock size ratio relationship between Viewer window 102 and window Canvas 103. To adjust the locked size ratio relationship, common seam 132 between Viewer window 102 and Canvas window 103. FIG. 3B is a modification of FIG. 3A, where cursor 140 has been placed on seam 132, activated by a mouse click, and subsequently dragged to the left. The dragging motion resulted in the leftward movement of seam 132 to adjust the size ratio relationship between Viewer window 102 and Canvas window 103, thereby defining a new size ratio relationship. Note that although the size relationship of the two windows was altered, the 4:3 aspect ratio of the display screen data within the windows was maintained.

FIG. 3B also illustrates there is a minimum size for the various windows. After cursor 140 was activated, it was dragged as far left as possible. However, Viewer window 102 only resized with respect to width by only a limited amount. In other words, once Viewer window 102 reached a predefined minimal size, it ceased to resize.

Figure 4A:
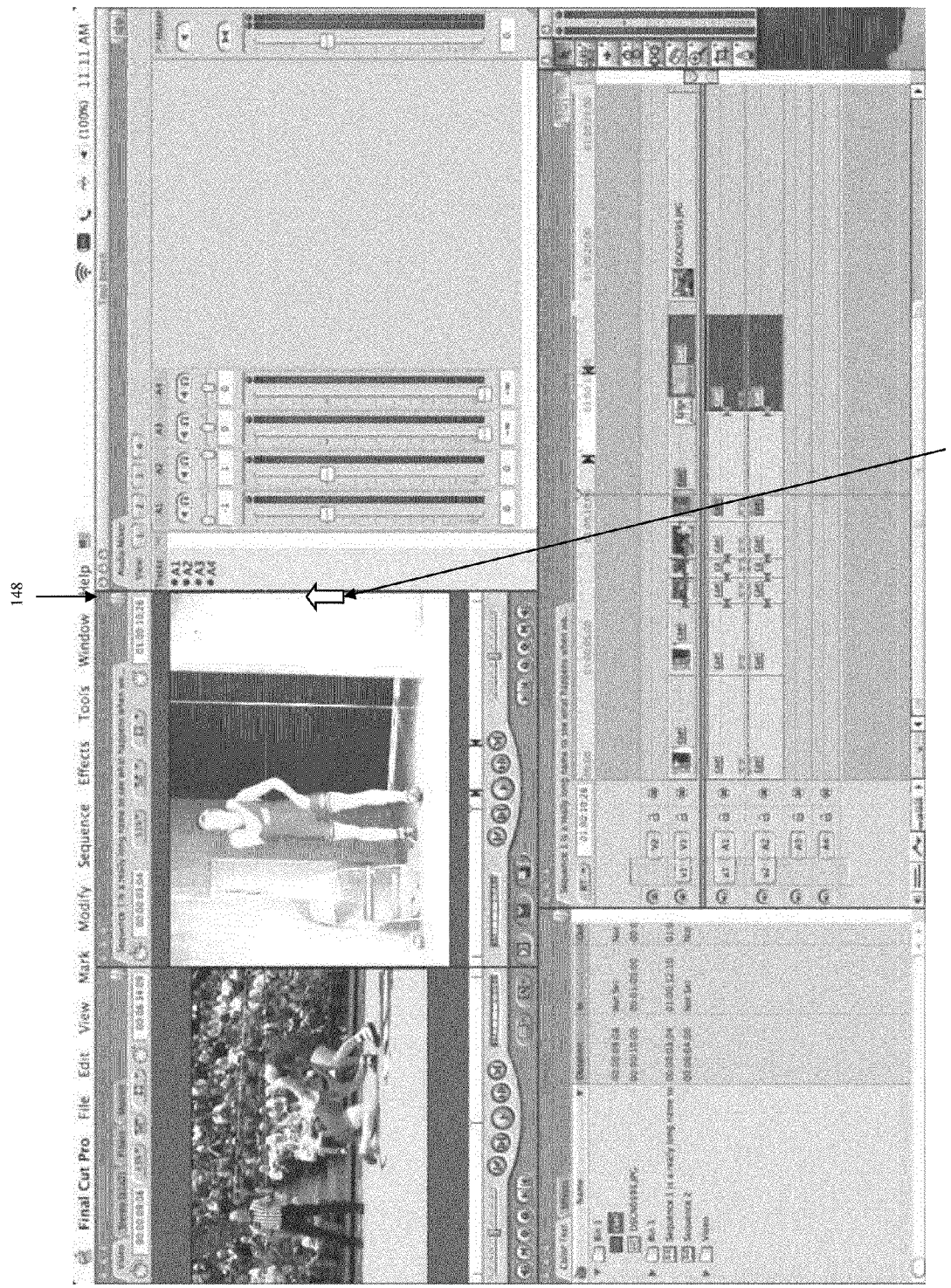
FIG. 4A illustrates one embodiment of the invention involving a graphical user interface of Final Cut Pro containing seven different windows.
Figure 4B:
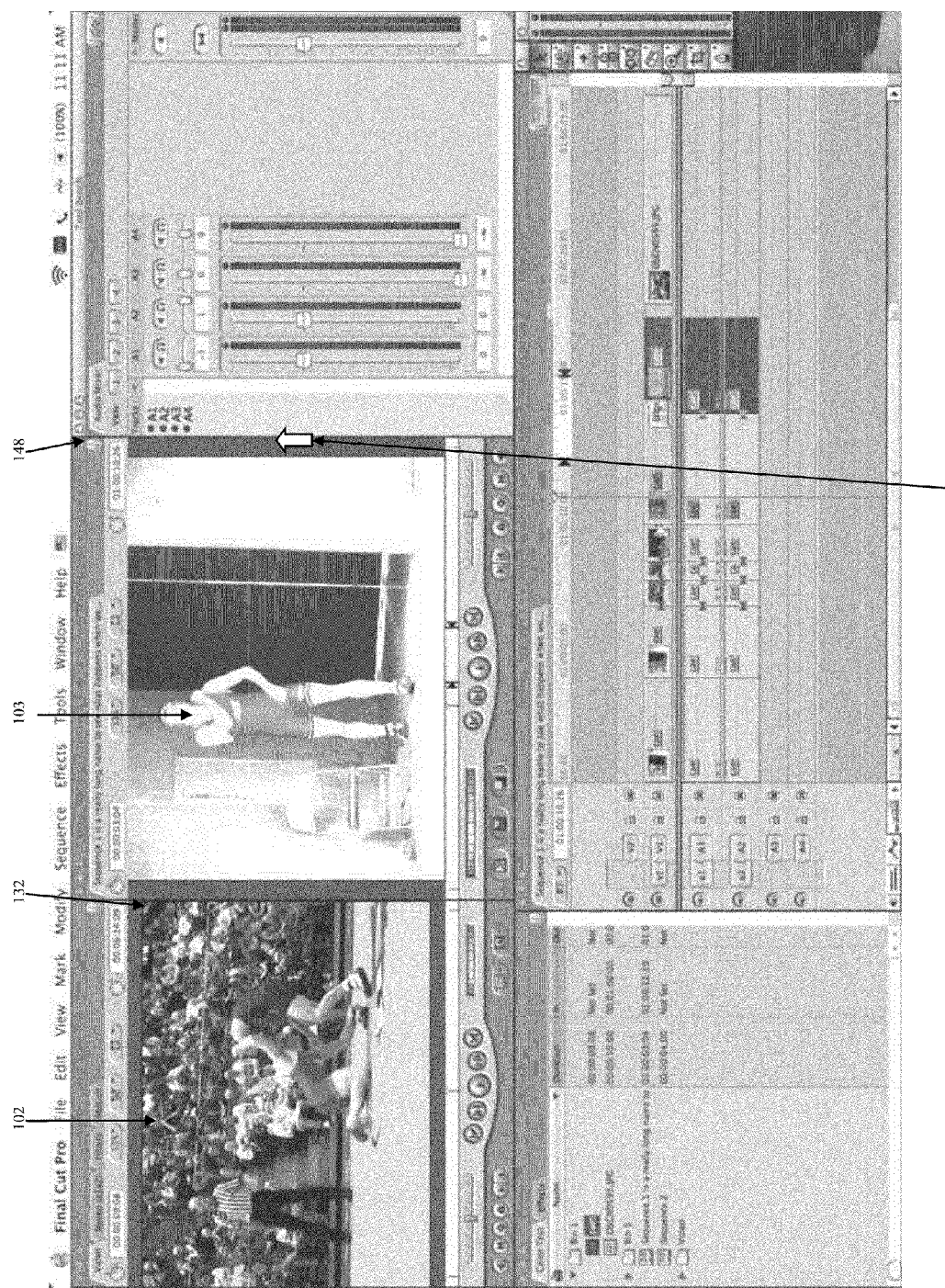
FIG. 4B illustrates a modification of FIG. 4A, where one resizable window is proportionally resized when a second resizable window is resized. The coordinated resizing of the windows is due to a preset relationship between them.

The new size ratio will remain locked. FIG. 4A illustrates a graphical user interface consisting of the same seven windows as in FIG. 3A wherein Cursor 140 is located over top of seam 148. FIG. 4B is a modification of FIG. 4A, where cursor 140 has been activated by a mouse click and subsequently dragged to the right. The dragging motion resulted in the rightward movements of both seam 148 and seam 132 (due to the locked size ratio relationship). The adjustment results in a corresponding proportional increase in the widths of Viewer window 102 and Canvas window 103. The proportional increase was, as mentioned above, due to the predetermined size ratio relationship between Viewer window 102 and Canvas window 103, as modified in FIG. 3B.

Figure 5A:
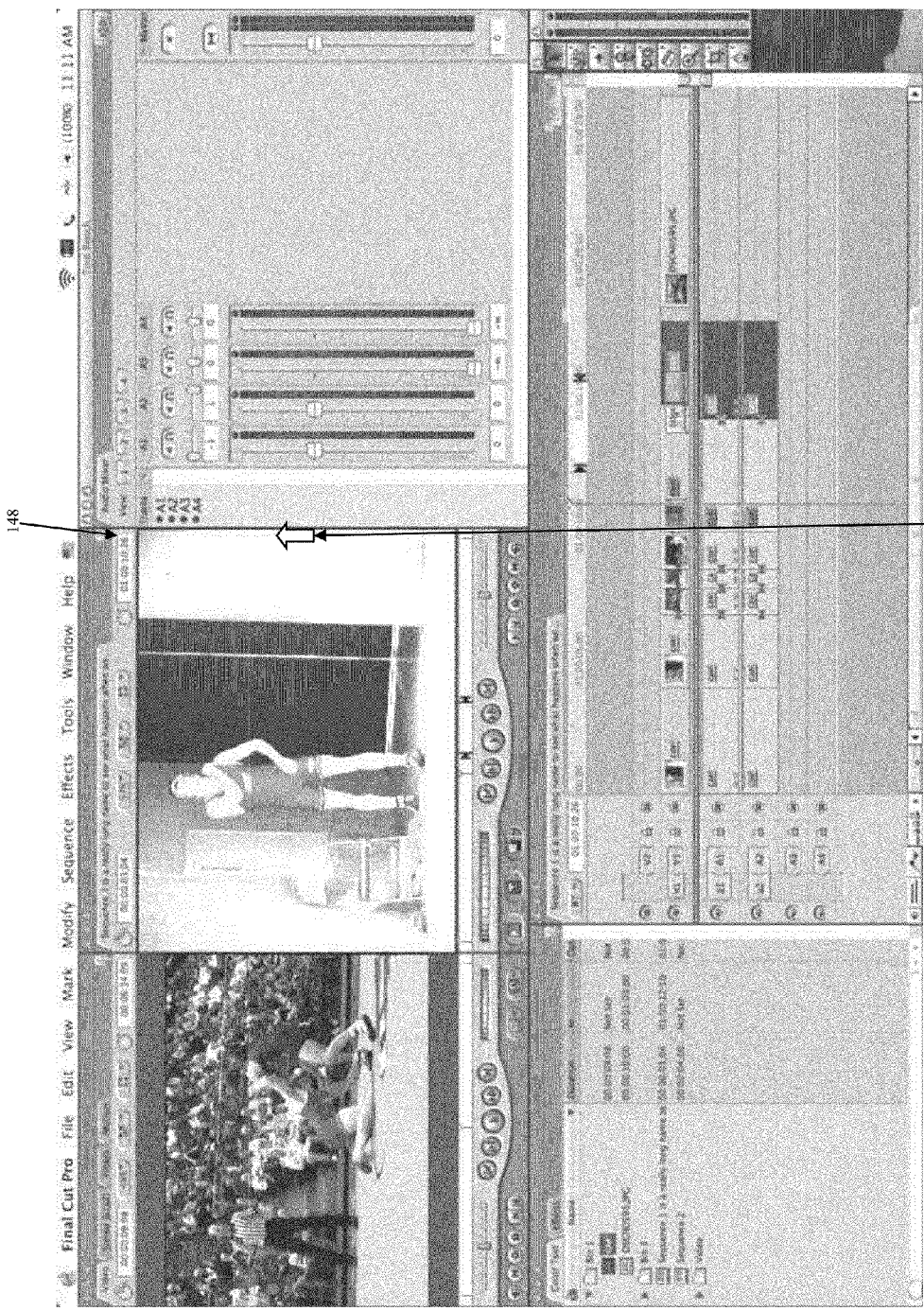
FIG. 5A illustrates one embodiment of the invention involving a graphical user interface containing seven different windows.
Figure 5B:
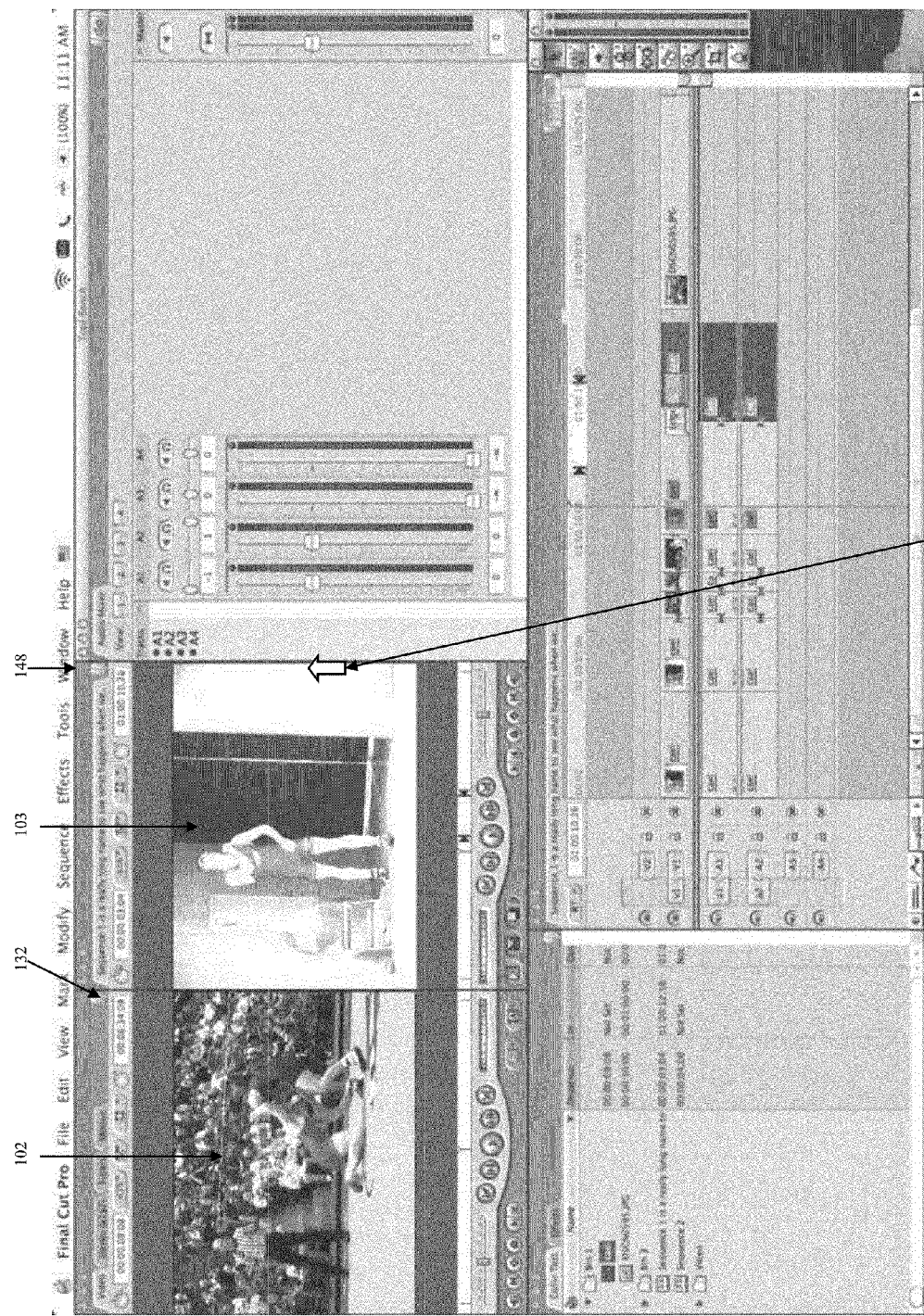
FIG. 5B illustrates a modification of FIG. 5A, where a preset size relationship between two windows is altered and the minimum size of a window is reached upon movement of a seam.

A locked size ratio is usually maintained only until a size limit is reached as show in FIGS. 5A and 5B. FIG. 5A illustrates a graphical user interface consisting of the same seven windows as in FIG. 4A. FIG. 5B is a modification of FIG. 5A, where cursor 140 has been placed over seam 148, activated by a mouse click, and subsequently dragged to the left. The dragging motion resulted in the leftward movements of both seam 148 and seam 132 until window 102 reaches its minimum size. After that point, the preset size relationship between Viewer window 102 and Canvas window 103 is not maintained. Seam 148 was dragged as far left as possible, which led to the maximal decrease in width for both Viewer window 102 and Canvas window 103. Once the maximal decrease (i.e., minimum window size) was achieved for Viewer window 102, dragging continued until the minimum window size for Canvas window 103 was achieved.

Figure 6A:
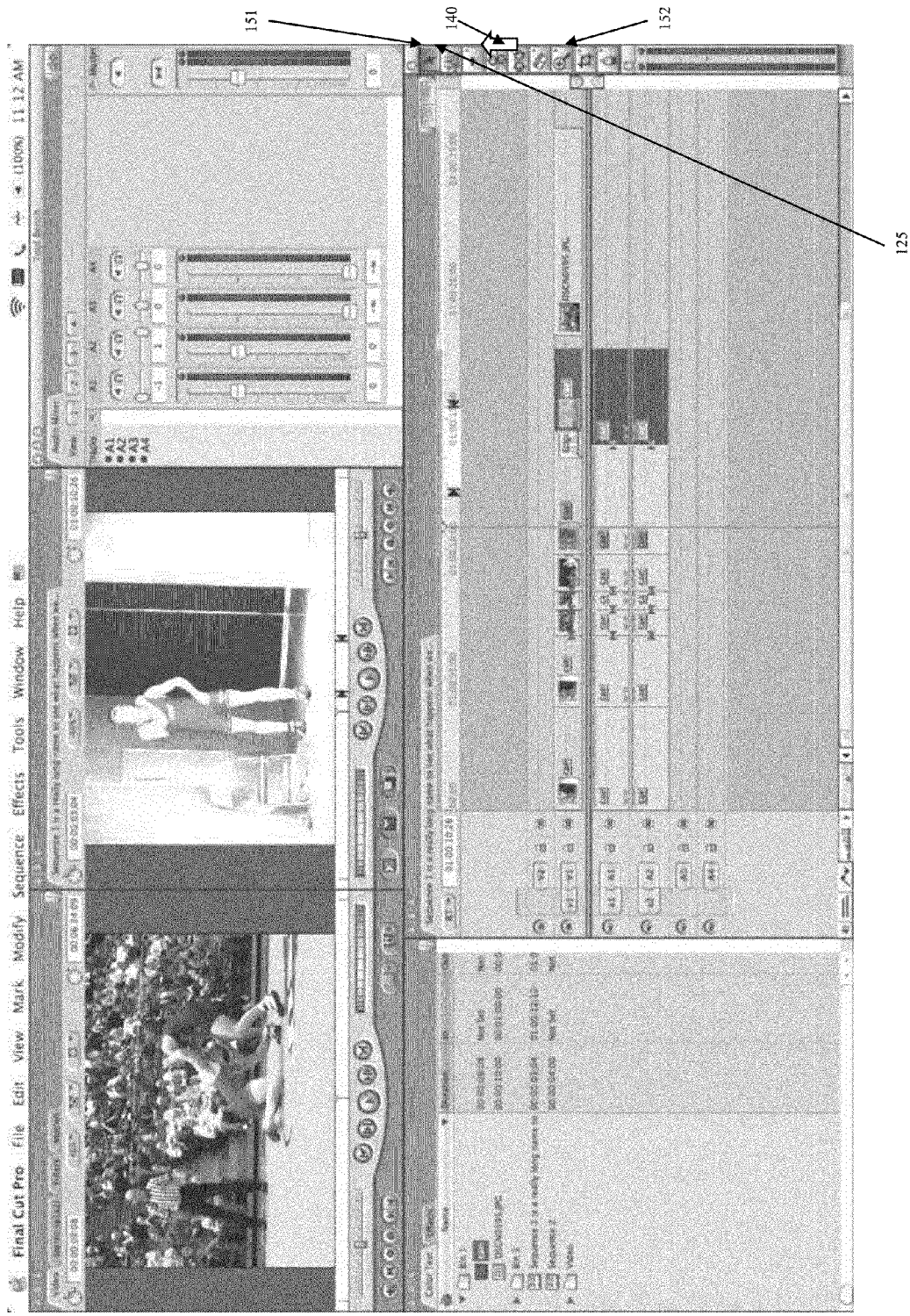
FIG. 6A illustrates one embodiment of the invention involving a graphical user interface containing seven different windows.

Non resizable windows will adjust the size of resizable windows that are encountered upon moving the non resizable window. FIG. 6A illustrates a graphical user interface consisting of the same seven windows as in FIG. 5A. Cursor 140 is over top of seam 152, which is formed at the boundary of Palette side 125 and the edge of the screen 151.

Figure 6B:
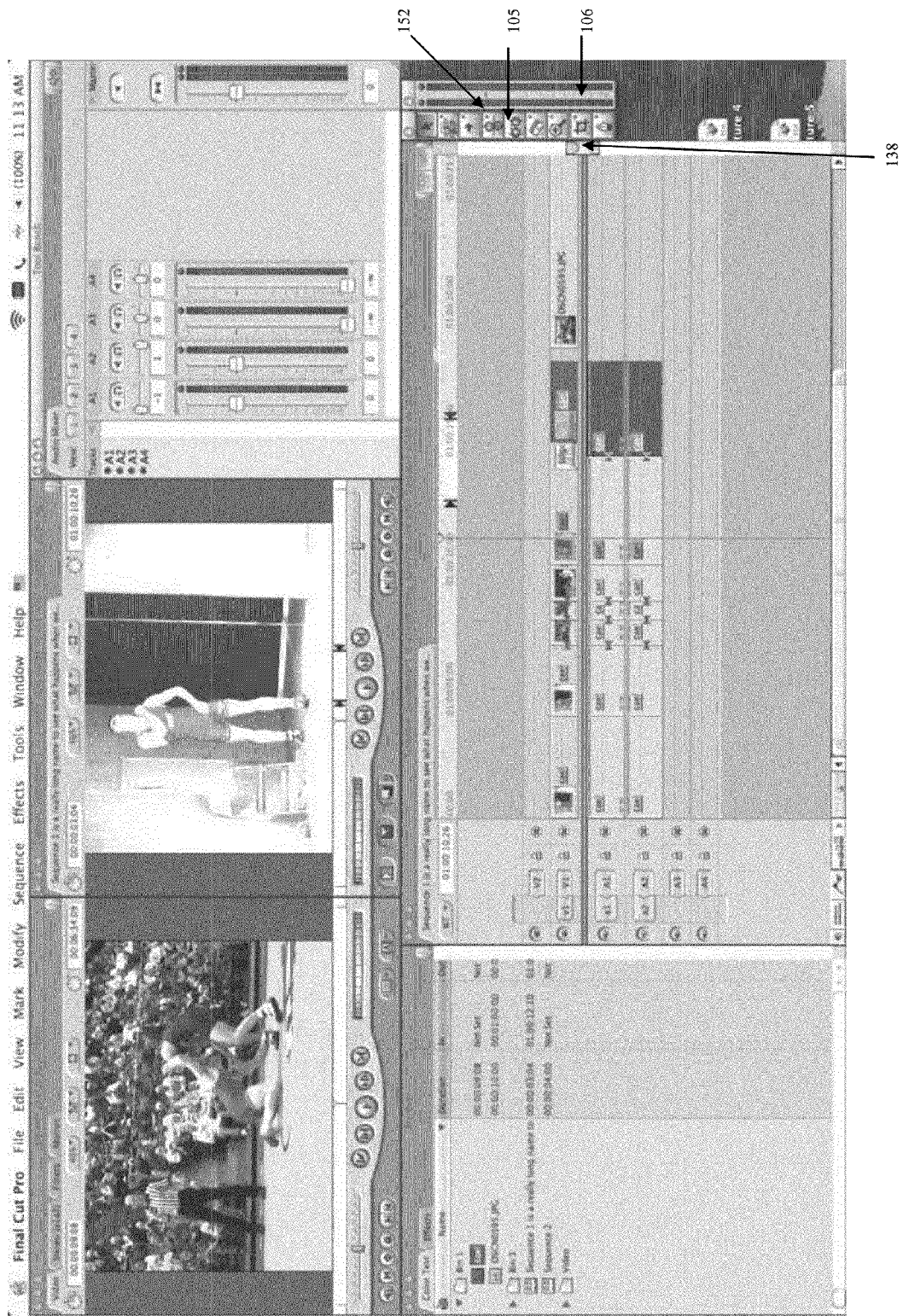
FIG. 6B illustrates a modification of FIG. 6A, where the movement of a non-resizable window (i.e., palette) results in the resizing of an adjacent resizable window.

FIG. 6B is a modification of FIG. 6A, where cursor 140 has been activated by a mouse click and subsequently dragged to the left a little more than one palette width. As previously set forth, in this embodiment of the invention, palettes are defined as non-resizable windows. Thus, when the user moves the non resizable palette, the first seam that is encountered that borders a resizable window, and that runs parallel to the seam being dragged, will also be moved. Thus, the leftward movement of seam 152 resulted in the leftward movement of seam 138 formed with the timeline window. After movement of seam 152, Palette 106 was moved upward and adjacent to the right hand side of Palette 105.

Figure 6C:
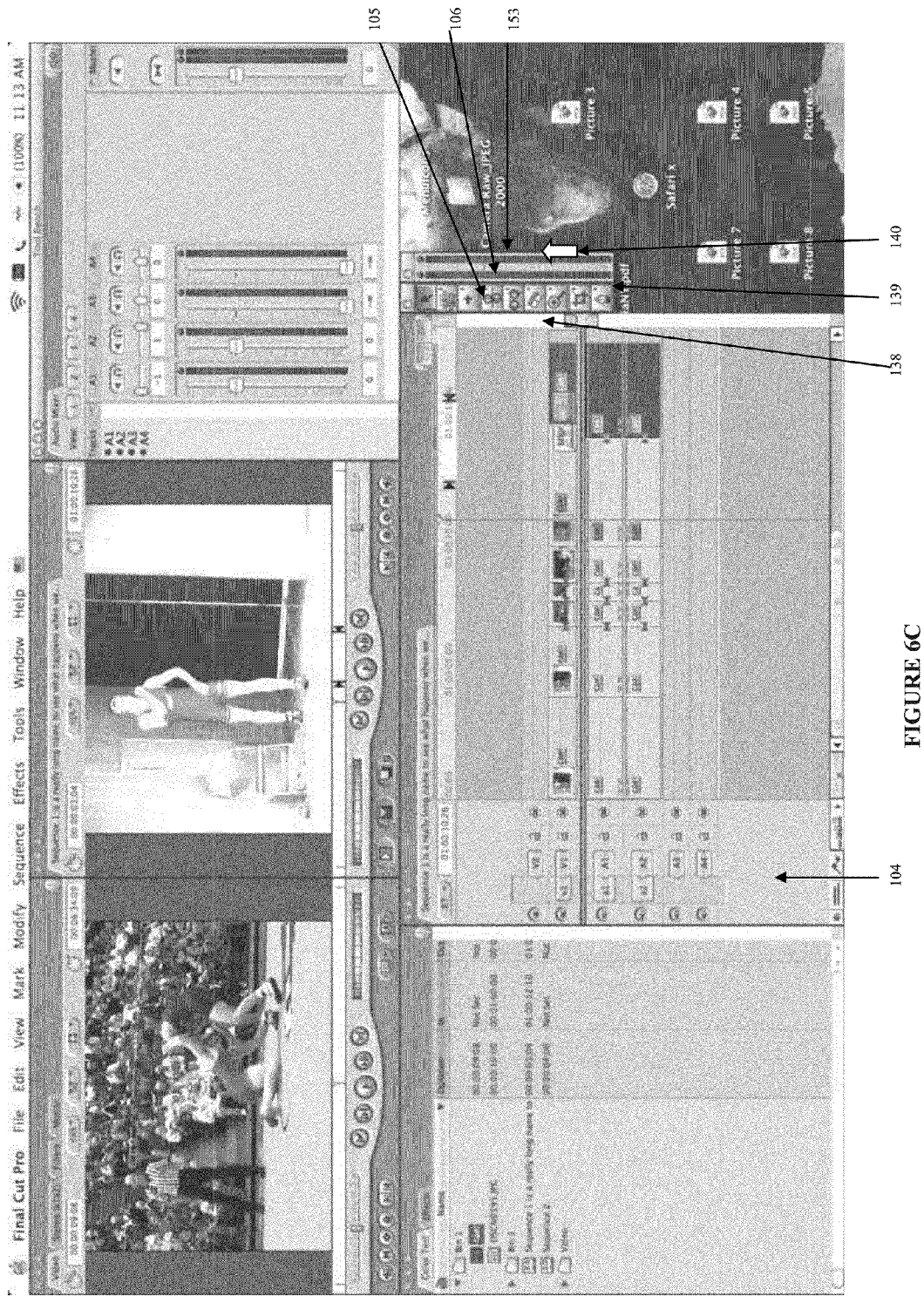
FIG. 6C illustrates a modification of FIG. 6B, where the movement of a non-resizable window first results in the movement of a second adjacent non-resizable window, which then results in the resizing of a resizable window adjacent to the second non-resizable window.

FIG. 6C is a modification of FIG. 6B, where cursor 140 was placed over top of Palette side 129 (which functions as seam 153 in this case), was activated by a mouse click, and was subsequently dragged to the left. The dragging motion resulted in the leftward movement of seams 153, 139, and 138. As for FIG. 6B, the rule regarding movement of a palette provides for the movement of the three seams (i.e., movement of Palettes 105 and 106 and resizing of Timeline 104). When seam 153 is moved, this embodiment of the invention searches for the first resizable window in the direction of drag. The first seam to the left of 153 is 139, which borders a non-resizable window (Palette 105). Palette 105 is accordingly moved, and the invention proceeds to find the first seam bordering a resizable window—seam 138.

Figure 7A:
FIG. 7A illustrates a single window in an embodiment of the invention. The window contains a display portion with a 4:3 aspect ratio.

FIG. 7A illustrates a single window, Canvas 103, which contains display portion 154. Canvas 103 is at its minimum height. Display portion 154 does not horizontally fill a substantial portion of Canvas 103, because a 4:3 aspect ratio for the display must be maintained.

Figure 7B:
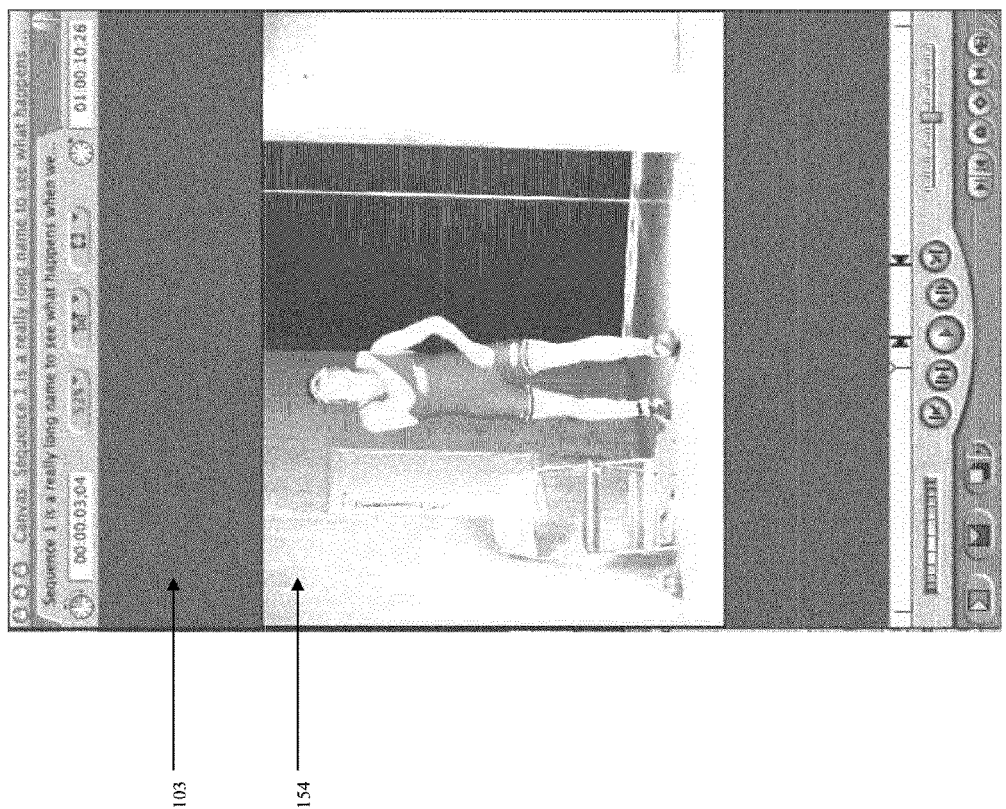
FIG. 7B illustrates a modification of FIG. 7A, where the window has been resized but the aspect ratio of the display was maintained.

FIG. 7B illustrates the same window as FIG. 7A, Canvas 103, where it has been resized such that it is at its minimum width but not minimum height. Video clip 154, in this case, does not vertically fill a substantial portion of Canvas 103, again because its aspect ratio must be maintained.

Figure 8A:
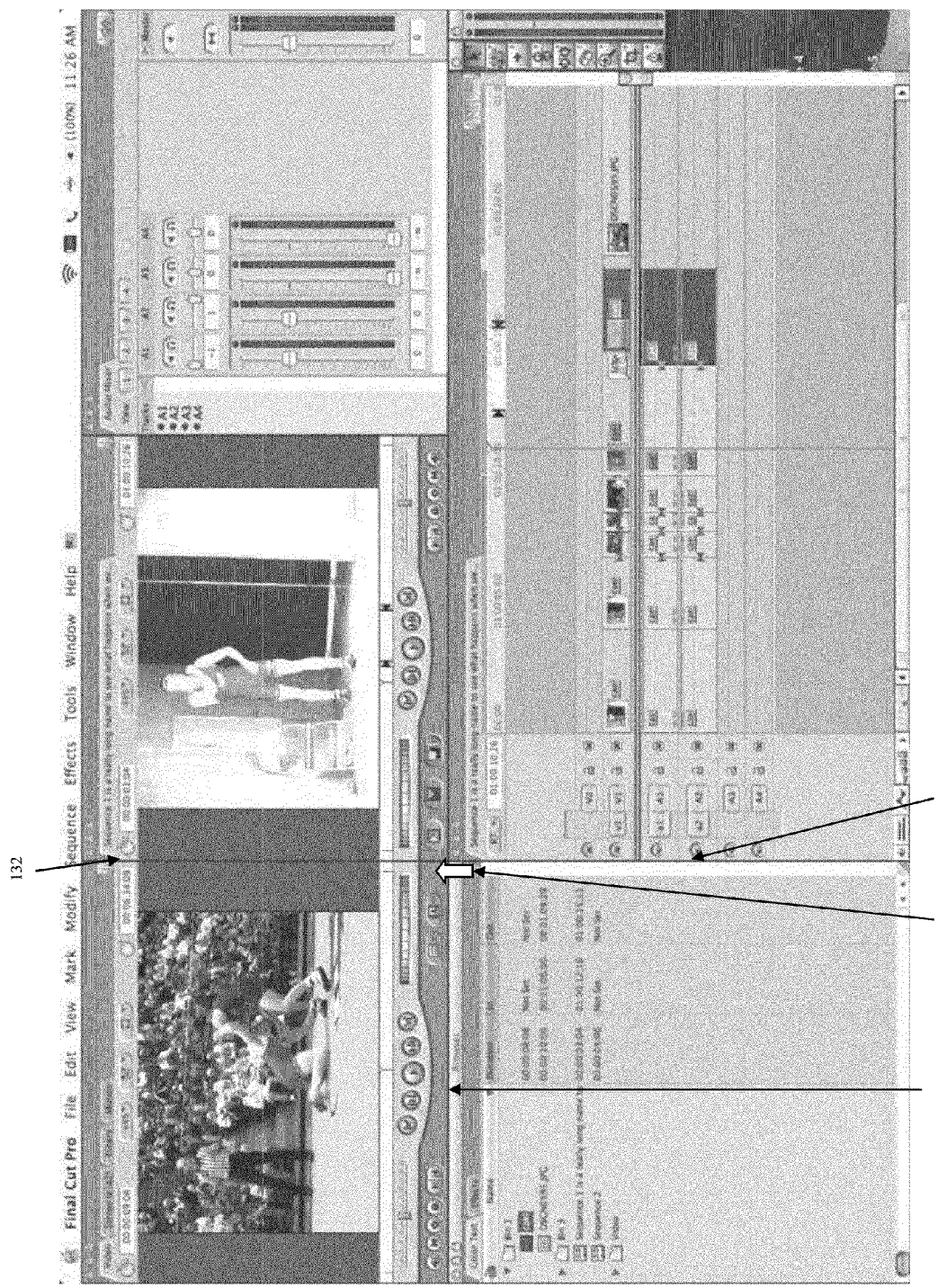
FIG. 8A illustrates one embodiment of the invention involving a graphical user interface containing seven different windows.

FIG. 8A illustrates a graphical user interface consisting of the same seven windows as in FIG. 6A. Cursor 140 is over the intersection of seams 132, 133, 134 and 142.

FIG. 8B is a modification of FIG. 8A, where cursor 140 has been activated by a mouse click and subsequently dragged to the right. The dragging motion resulted in the rightward movement of seam 142. In this case, an upward or downward dragging motion would not have resulted in the movement of scam 133. This invention embodiment contains a rule where the activation and movement of a cursor at the intersection of two seams can cause resizing of a window or windows in the horizontal but not vertical direction.

Figure 9:
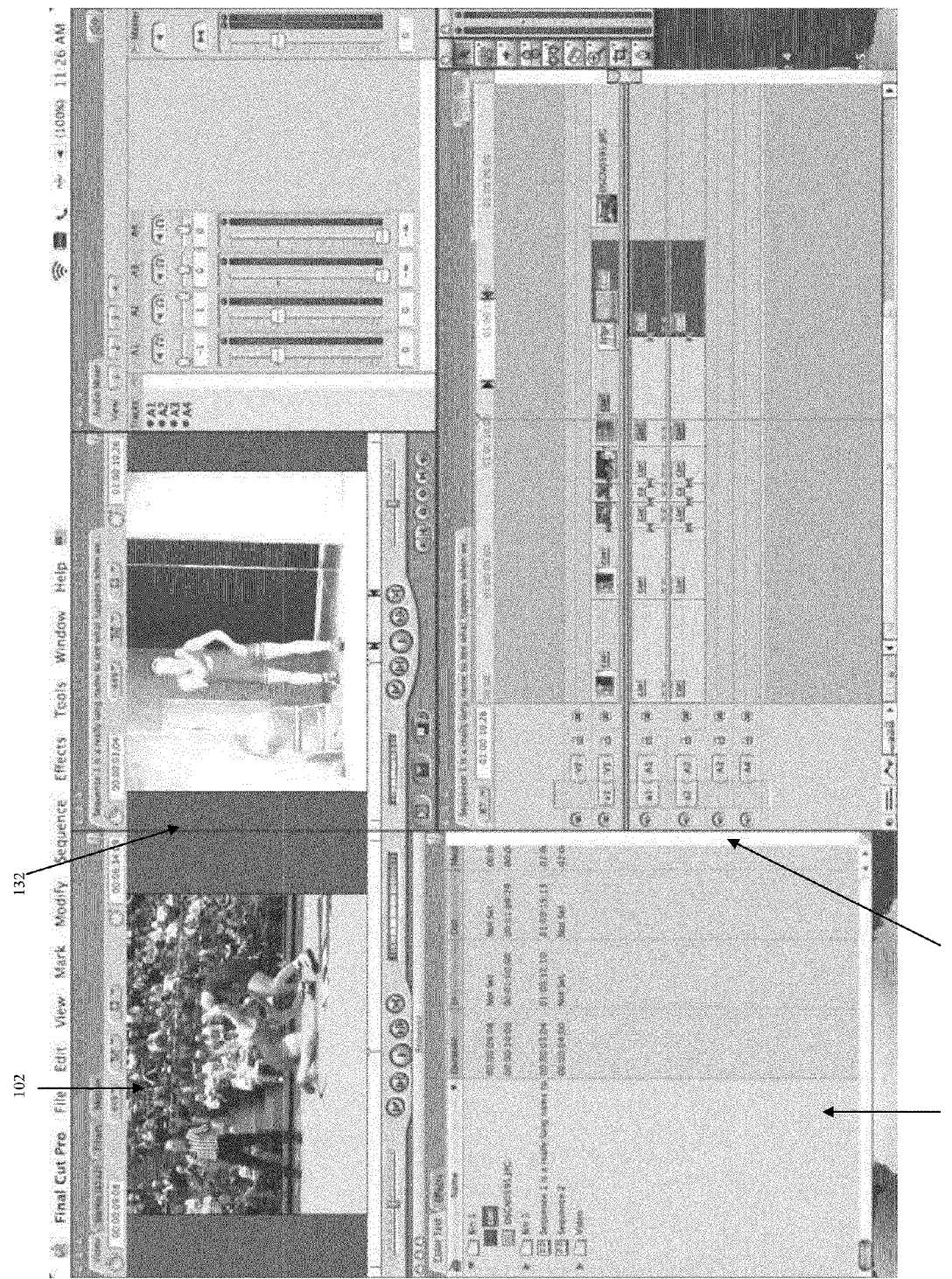
FIG. 9 illustrates a one pixel overlap between two windows.

FIG. 9 illustrates a one pixel overlap between Viewer window 102 and Browser window 101, where Browser window 101 is lying over a portion of Viewer window 102. Seams 132 and 142 are considered vertically continuous. Accordingly, if a user selects and moves seam 132, seam 142 will also be moved.

Figure 10A:
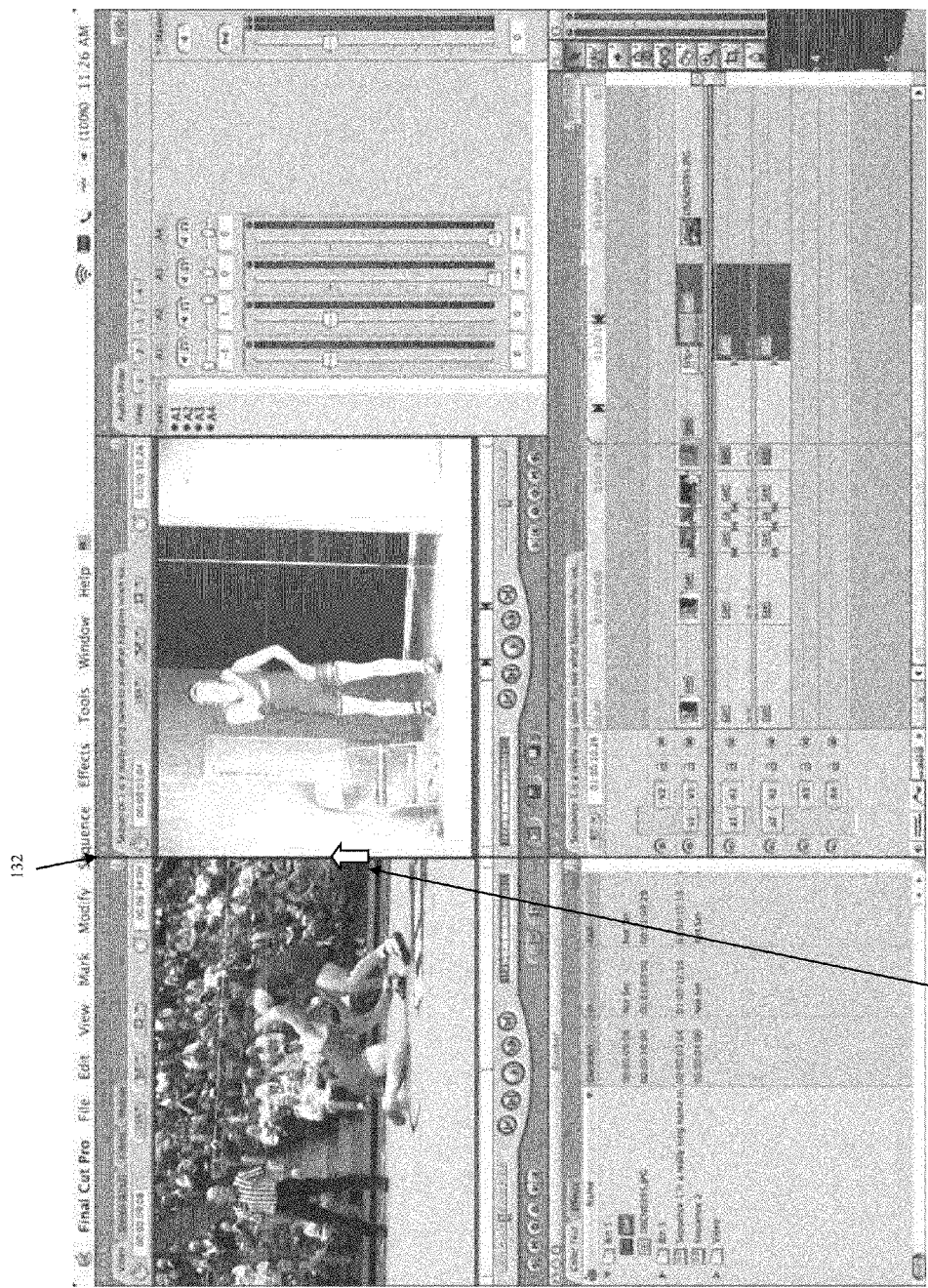
FIG. 10A illustrates one embodiment of the invention involving a graphical user interface containing seven different windows.

FIG. 10A illustrates a graphical user interface consisting of the same seven windows as in FIG. 8A. Cursor 140 has been positioned over seam 132.

Figure 10B:
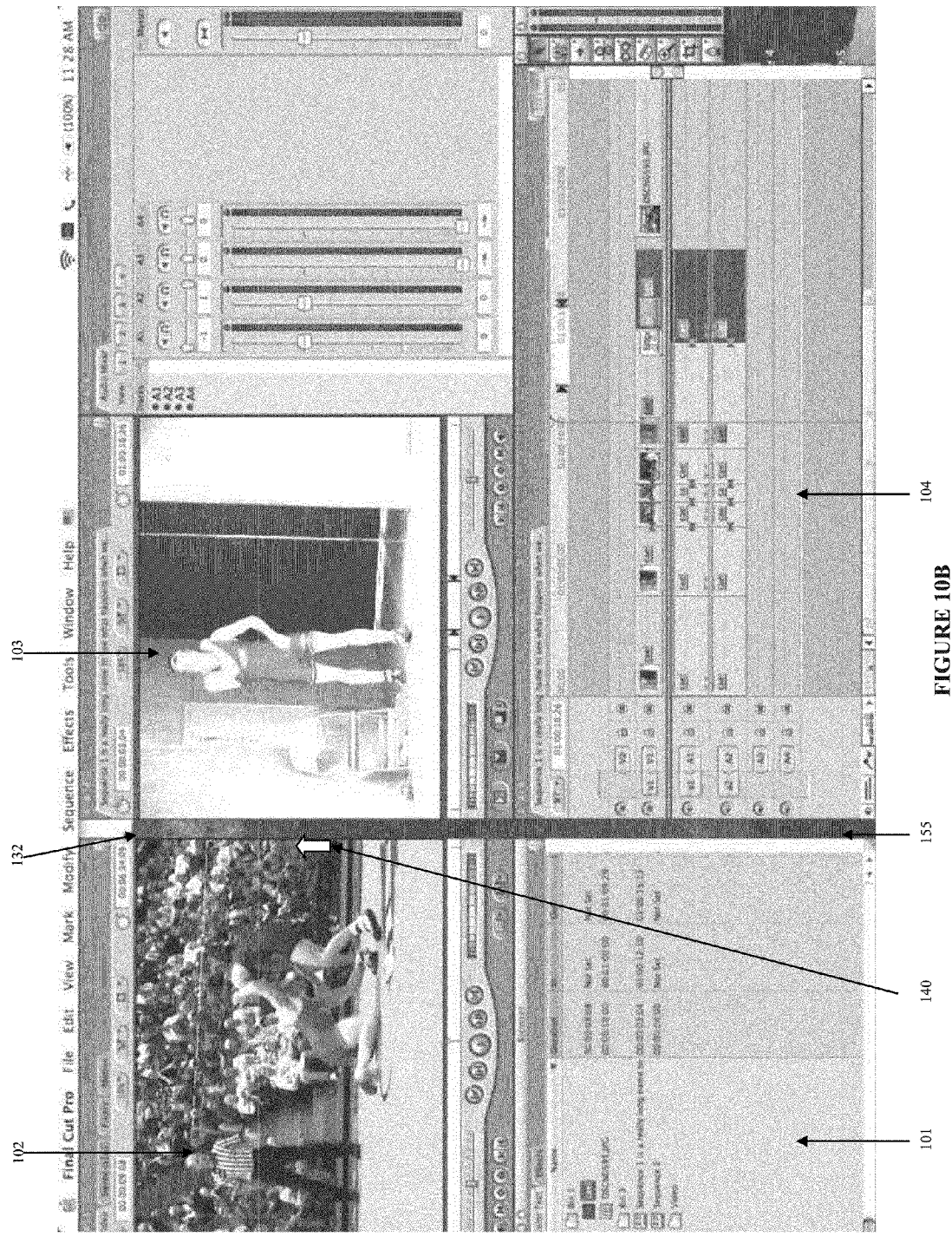
FIG. 10B illustrates a modification of FIG. 10A, where the movement of a seam away from a bordering window provides an opening exposing the screen underneath the windows.

FIG. 10B is a modification of FIG. 10A, where cursor 140 has been activated by a mouse click and subsequently dragged to the left. The dragging motion resulted in the leftward movement of seam 132. The movement left a vertical opening 155 between Viewer window 102 and Canvas window 103, as well as Browser window 101 and Timeline window 104. The vertical opening 155 exposes the screen underneath the windows.

Figure 10C:
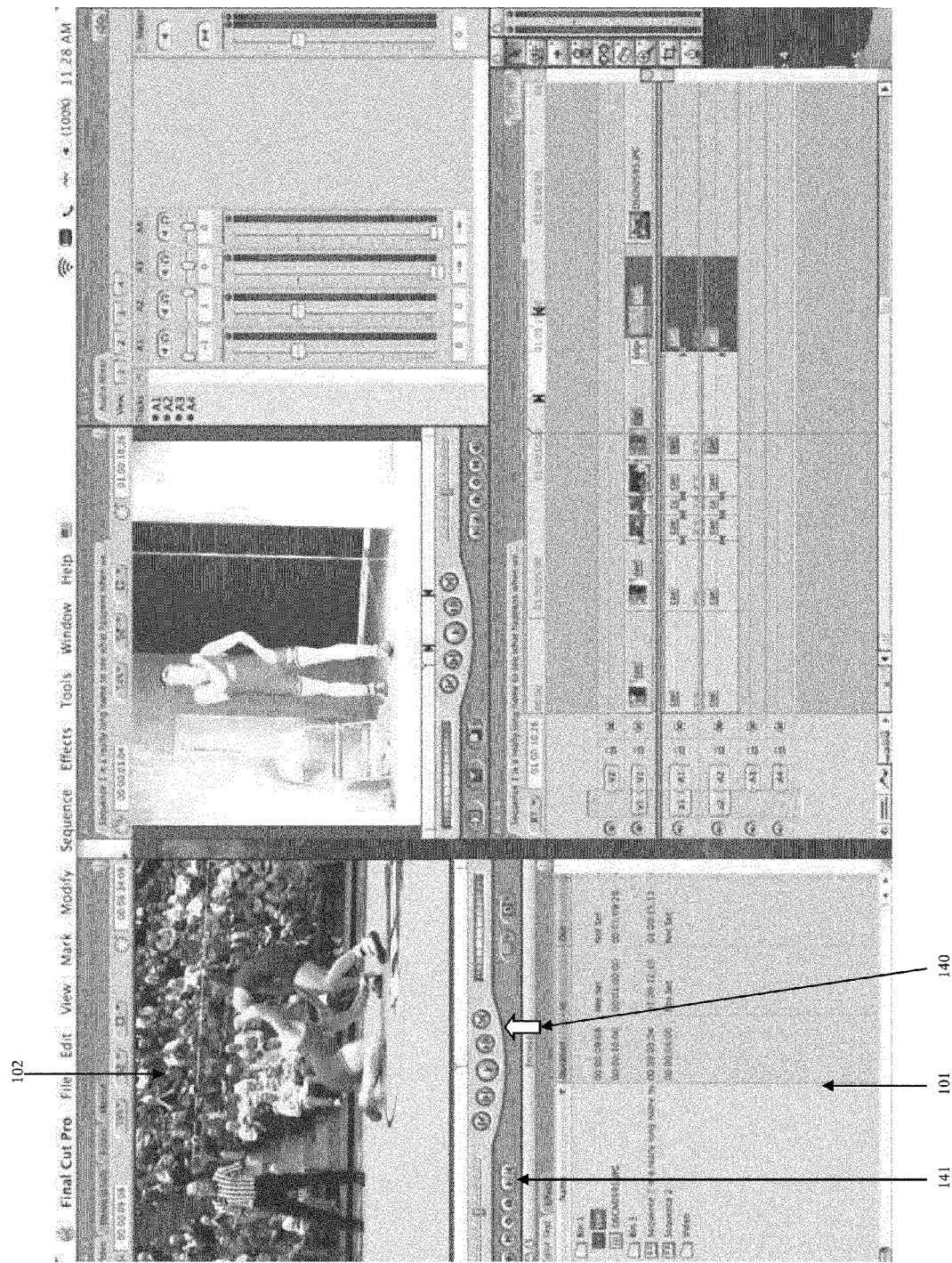
FIG. 10C illustrates a modification of FIG. 10B, where the windows moved in FIG. 10B are resized.

FIG. 10C is a modification of FIG. 10B, where cursor 140 has been placed on top of seam 141, activated by a mouse click and subsequently dragged downward. The dragging motion resulted in the downward movement of seam 141, which resulted in the vertical expansion of Viewer window 102 and vertical contraction of Browser window 101. No other windows were resized in the process.

Figure 11A:
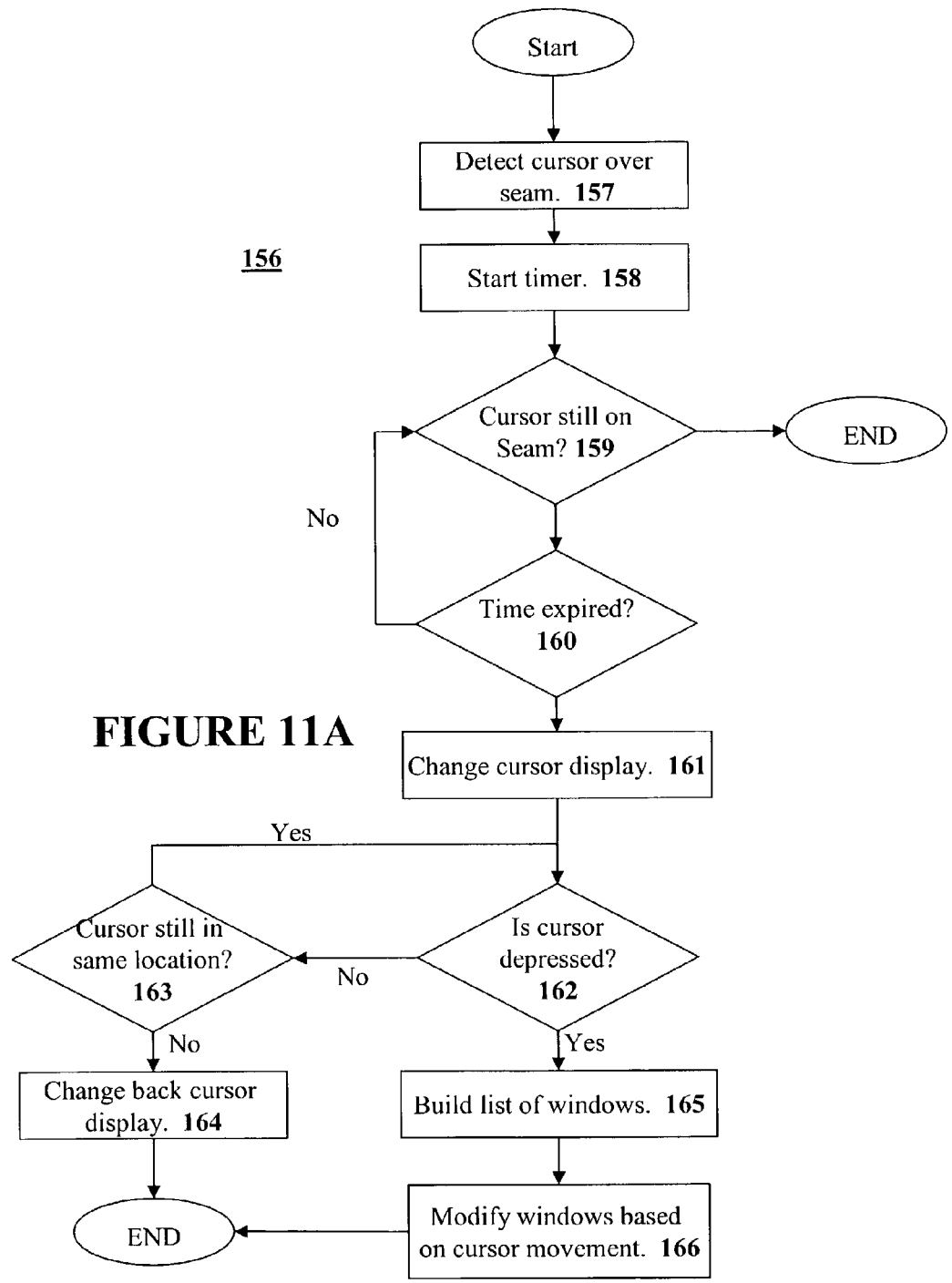
FIG. 11A illustrates a process whereby windows are dynamically resized in one embodiment of the invention.

FIG. 11A illustrates one possible embodiment of a process that dynamically resizes windows. The process 156 initially detects (at step 157) whether a cursor is over a particular seam. Once such a cursor is detected, a timer is started at step 158. At preset intervals (e.g., one tenth of a second), the cursor is examined at step 159 to see whether it is still over the original seam. The cursor is not altered if it is not. If it is, then a determination is made at step 160 as to whether the cursor has been over the seam long enough (e.g., half a second) to indicate an intention to select the seam. At step 161, the cursor display is changed to show that the seam can be selected upon cursor activation.

Once the cursor is activated (e.g., depression of mouse button) at step 162, a list of windows associated with the seam is built at step 165. The windows are subsequently modified (e.g., resized) based on cursor movement at step 166. If the cursor is not activated, the cursor is examined at step 163 to determine whether it is still over the original seam. Where it is not, the cursor display is changed back at step 164 such that it no longer indicates an intention to select the seam.

Figure 11B:
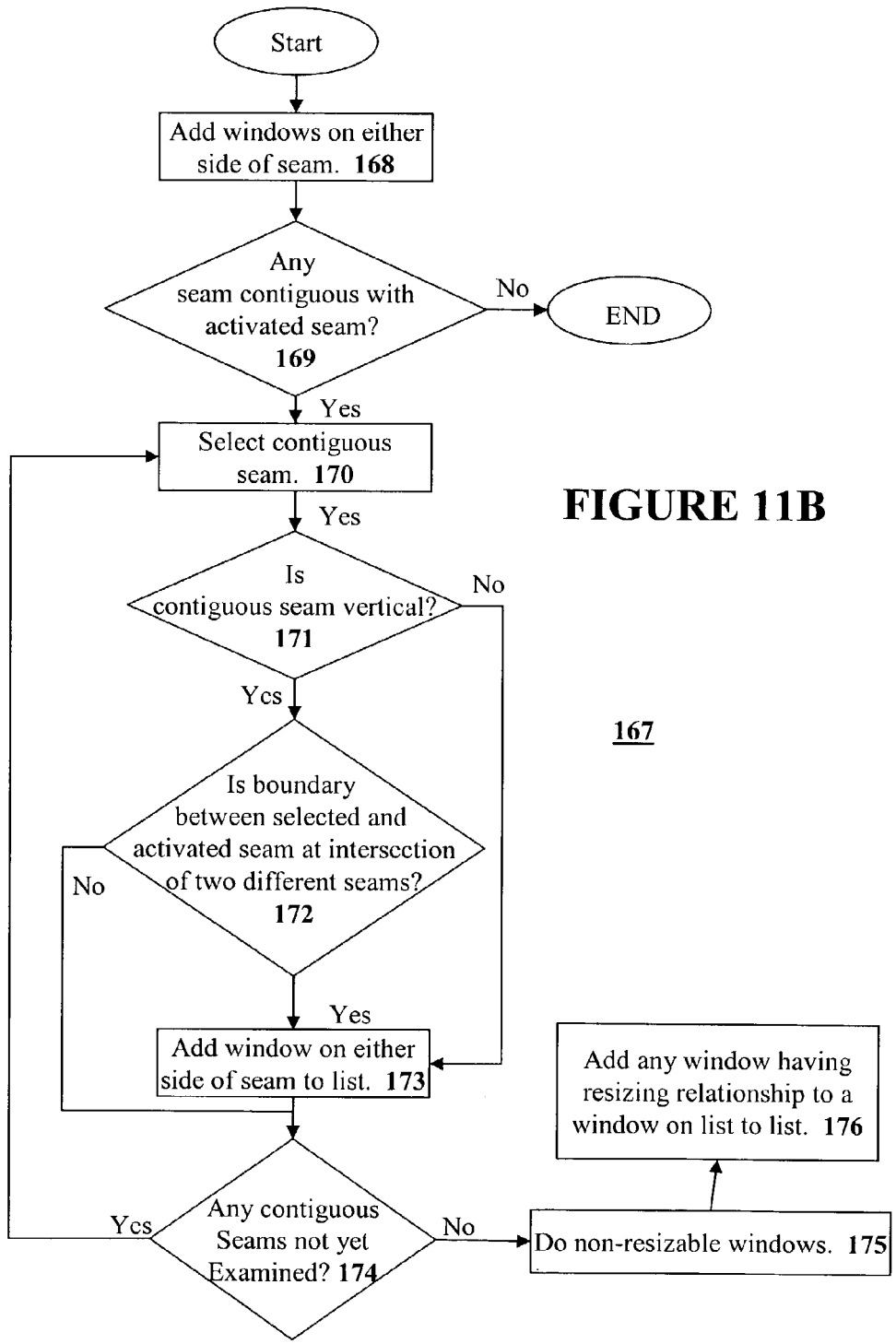
FIG. 11B illustrates a process whereby a list of windows is built in one embodiment of the invention.

FIG. 11B illustrates a process 167 by which the list of windows associated with the seam is built at step 165 in process 156 (FIG. 11A). After a seam has been activated by depressing the cursor at step 162, windows on either side of the activated seam are added to the list at step 168. Next, at step 169, the system determines whether any additional seams are contiguous with the activated seam. If so, then the contiguous scam is selected at step 170. The contiguous seam is examined at step 171 to determine if it is a vertical seam. Vertical, continuous seams are further analyzed with respect to their location. Specifically, at step 172, the process examines if the boundary of the selected and activated seams is at an intersection of two different seams. Where it is, the window on either side of the continuous, vertical seam is added to the list at step 173. Should the seam at step 171 be a horizontal rather than a vertical seam, then the window on either side of the seam is added directly to the list at step 173.

After step 173 of the process 167, it is determined whether any other contiguous seams need to be examined at step 174. If so, then steps 170 through 174 are repeated until all contiguous seams have been analyzed. After analyzing all the seams, then the non-resizable windows are analyzed at step 175. The analysis of non-resizable windows which is further explained 177 in FIG. 1C. Finally, at step 176, any windows having a resizing relationship to a window on the list are added to the list. An example of windows having a resizing relationship is Viewer window 102 and Canvas window 103 discussed above in reference to the figures.

Figure 11C:
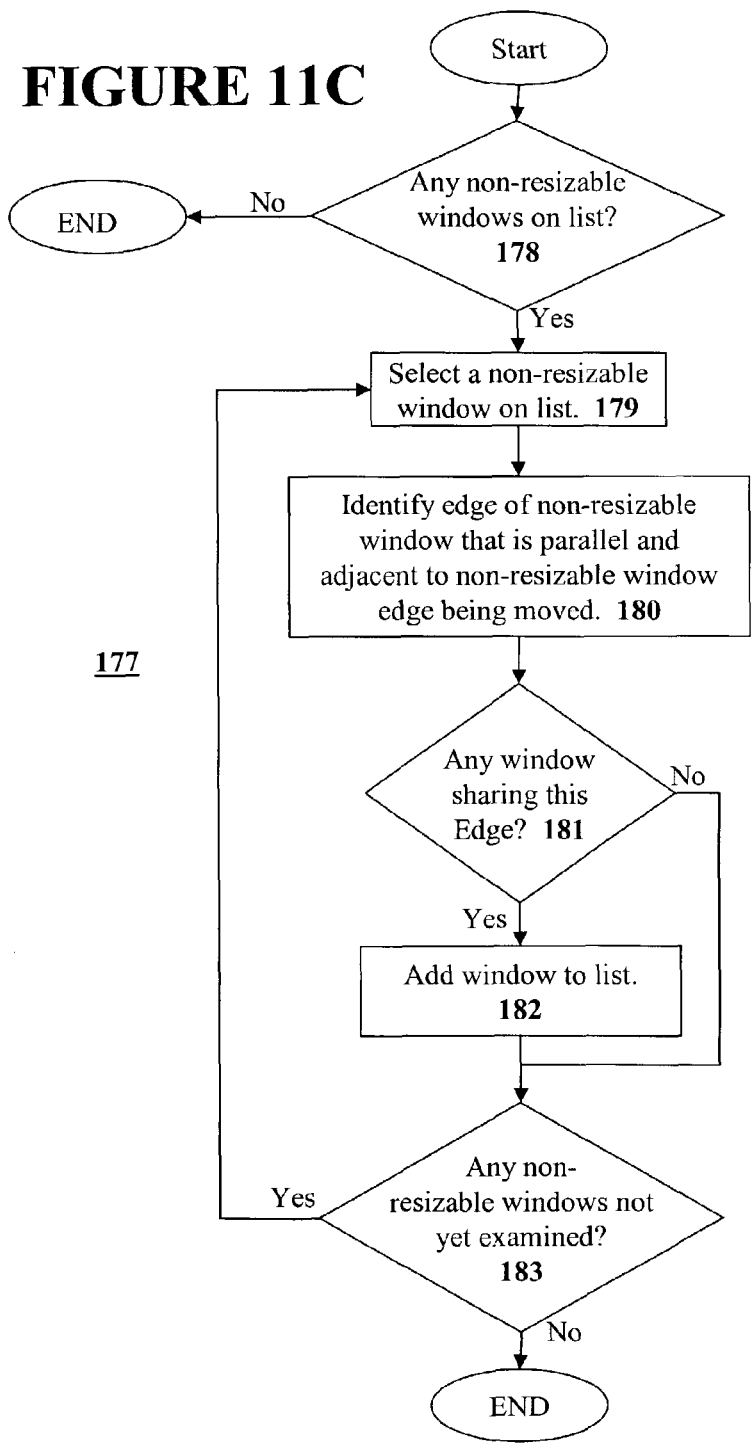
FIG. 11C illustrates a process whereby non-resizable windows are examined in one embodiment of the invention.

FIG. 11C illustrates a process 177 by which non-resizable windows are examined in step 176 of process 167 (FIG. 11B). At step 178, it is determined whether there are any resizable windows on the list. If there are, then at 179 one of the listed non-resizable windows is selected. At step 180, a second edge of the non-resizable window is identified, where the second edge is parallel to a first edge of the non-resizable window that abuts an activated seam. Any window sharing such a second edge is first identified at step 181 and then added to the list at step 182. Whether there are any non-resizable windows on the list that have not been examined is determined at step 183. If there are, then steps 179 through 183 are repeated until all non-resizable windows have been examined.

Figure 11D:
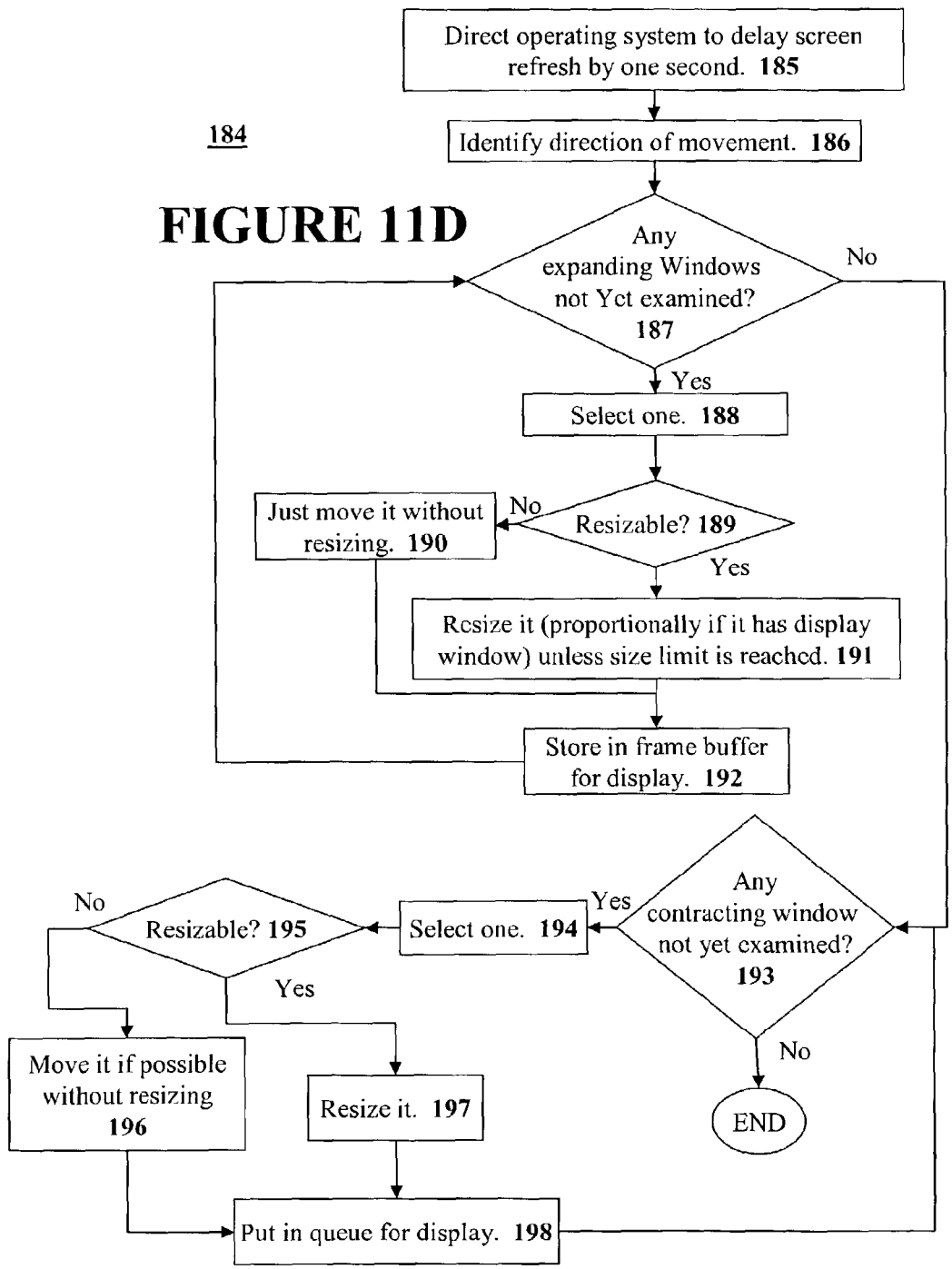
FIG. 11D illustrates a process whereby windows are modified based on cursor movement in one embodiment of the invention.

FIG. 11D illustrates a process 184 by which windows are modified based on cursor movement in step 166 of process 156 (FIG. 11A). The operating system is directed to delay the screen refresh by one second at step 185. This delay allows window movements that take less than one second to appear as though they occur simultaneously. At step 186, the direction of window movement is identified, and whether any expanding windows have not been examined is determined at step 187. If there are expanding windows that have not been examined, one is selected at step 188. The selected window is examined as to whether it is resizable at step 189. Resizable windows are resized at step 191 unless the minimum size limit for the subject window has been reached. Such a size limit is illustrated in reference to the Viewer window 102 and Canvas window 103 shown in FIG. 5B. Furthermore, resizing at step 191 maintains any proportionality relationships predefined for displays contained in the window. Resized windows are stored in the frame buffer for display at step 192.

If at step 189, it is found that the selected, expanding window is not resizable, it is simply moved at step 190 without resizing. It is then stored in the frame buffer for display at step 192. Steps 187 through 192 are repeated until all expanding windows have been examined.

Once all expanding windows have been examined, whether there are any contracting windows that have not been examined is determined at step 193. If there are some that have not been examined, then at step 194 one is selected. If the selected window is resizable, as found at step 195, then the window is resized at step 197 and put in the queue for display at step 198. If the selected window is not resizable, it is moved without resizing.

Figure 12:
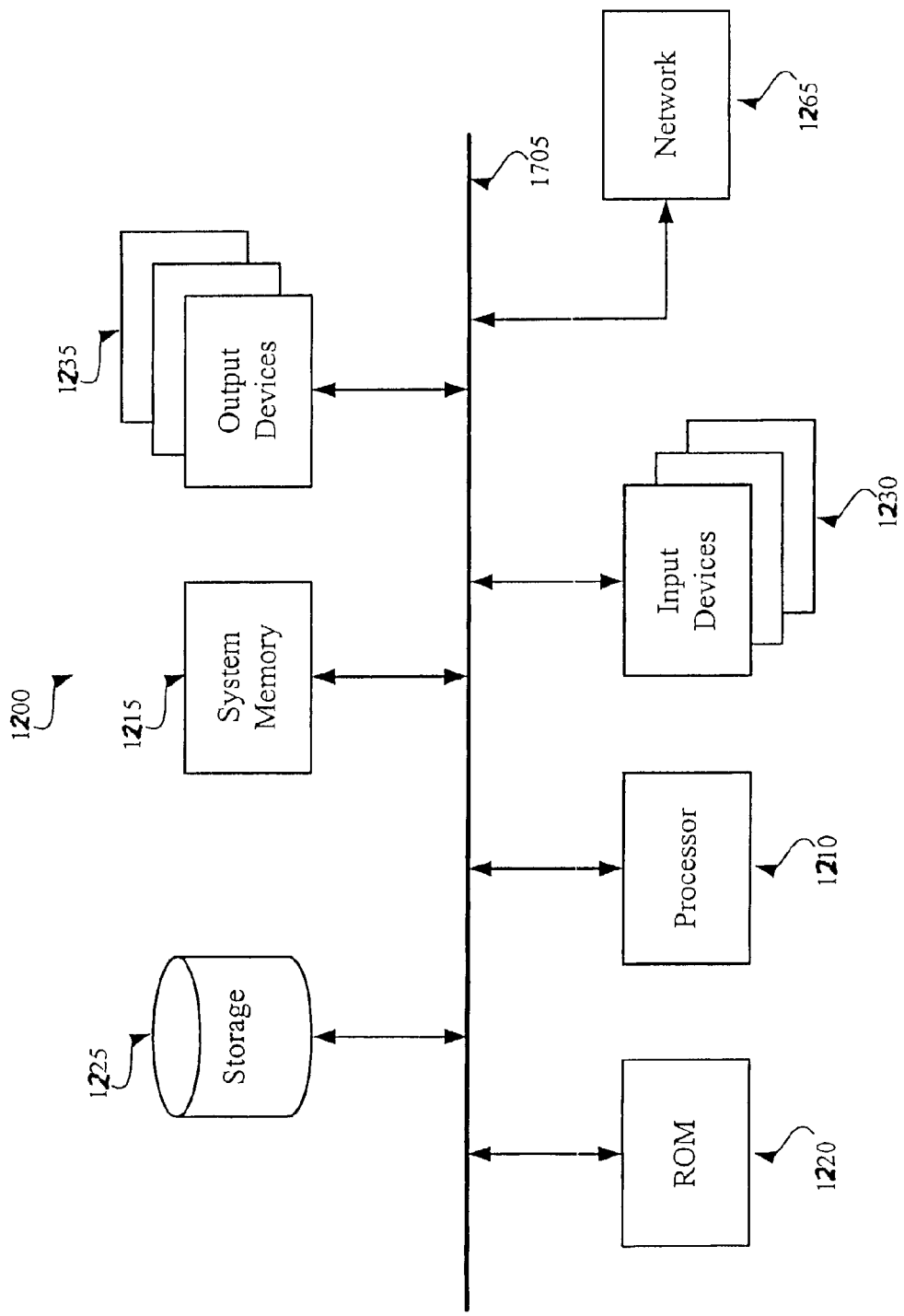
FIG. 12 illustrates a computer system with which one embodiment of the invention is implemented.

FIG. 12 presents a computer system with which one embodiment of the invention is implemented. Computer system 1200 includes a bus 1205, a processor 1210, a system memory 1215, a read-only memory 1220, a permanent storage device 1225, input devices 1230, and output devices 1235.

The bus 1205 collectively represents all system, peripheral, and chipset buses that communicatively connect the numerous internal devices of the computer system 1200. For instance, the bus 1205 communicatively connects the processor 1210 with the read-only memory 1220, the system memory 1215, and the permanent storage device 1225.

From these various memory units, the processor 1210 retrieves instructions to execute and data to process in order to execute the processes of the invention. The read-only-memory (ROM) 1220 stores static data and instructions that are needed by the processor 1210 and other modules of the computer system.

The permanent storage device 1225, on the other hand, is a read-and-write memory device. This device is a non-volatile memory unit that stores instructions and data even when the computer system 1200 is off. Some embodiments of the invention use a mass-storage device (such as a magnetic or optical disk and its corresponding disk drive) as the permanent storage device 1225.

Other embodiments use a removable storage device (such as a floppy disk or ZIP® disk, and its corresponding disk drive) as the permanent storage device. Like the permanent storage device 1225, the system memory 1215 is a read-and-write memory device. However, unlike storage device 1225, the system memory is a volatile read-and-write memory, such a random access memory. The system memory stores some of the instructions and data that the processor needs at runtime. In some embodiments, the invention's processes are stored in the system memory 1213, the permanent storage device 1225, and/or the read-only memory 1220.

The bus 1205 also connects to the input and output devices 1230 and 1235. The input devices enable the user to communicate information and select commands to the computer system. The input devices 1230 include alphanumeric keyboards and cursor-controllers. The output devices 1235 display images generated by the computer system. For instance, these devices display IC design layouts. The output devices include printers and display devices, such as cathode ray tubes (CRT) or liquid crystal displays (LCD).

Finally, as shown in FIG. 12, bus 1205 also couples computer 1200 to a network 1265 through a network adapter (not shown). In this manner, the computer can be a part of a network of computers (such as a local area network ("LAN"), a wide area network ("WAN"), or an Intranet, or a network of networks, such as the internet. Any or all components of computer system 1200 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. For instance, although the invention was discussed in terms of windows arising from a single application, it should be realized that windows from different applications can be dynamically resized. Also, even though the specific operating system used in the instant case was OS-10, other operating systems can readily be used. Thus, one of ordinary skill in the art would understand that the invention is not to be limited by the foregoing illustrative details, but rather is to be defined by the appended claims.

I claim:

1. A non-transitory computer readable medium storing a computer program for execution by at least one processor, said computer program comprising:
    a set of instructions for displaying a plurality of independently resizable windows, each window having a set of outer edges that are individually selectable and movable to resize the window;
    a set of instructions for defining a selectable and movable seam between first and second windows when a first outer edge of the first window is brought into contact with a first outer edge of the second window;
    a set of instructions for resizing the first and second windows in response to a selection and a movement of the seam; and
    a set of instructions for resizing the first window but not the second window in response to a selection and a movement of the first outer edge of the first window when the first outer edges of the first and second windows are in contact.

2. A non-transitory computer readable medium of claim 1, wherein said first and second windows are separate windows that do not encompass one another.

3. A non-transitory computer readable medium of claim 1, wherein said seam is a first seam, wherein the computer program further comprises:
    a set of instructions for identifying a second seam that is continuous with said first seam; and
    a set of instructions for resizing each window that borders said second seam in response to the selection and the movement of the first seam.

4. A non-transitory computer readable medium of claim 1, wherein the first window has a predetermined minimum size and a predetermined maximum size, the computer program further comprising a set of instructions for expanding or contracting a set of windows that border the first window in response to the selection and the movement of the seam when the first window reaches the predetermined minimum size or the predetermined maximum size.

5. A non-transitory computer readable medium of claim 1, wherein said first window comprises a display having an aspect ratio, wherein the set of instructions for resizing the first and second windows comprises a set of instructions for maintaining the aspect ratio of the display while resizing the first and second windows in response to the selection and the movement of the seam.

6. A non-transitory computer readable medium of claim 1, wherein said first and second windows have a size ratio relationship with one another, wherein the set of instructions for resizing the first and second windows comprises a set of instructions for resizing said second window in a same proportion as the resizing of the first window in order to maintain the size ratio relationship between said first and second windows.

7. A non-transitory computer readable medium of claim 1, wherein the computer program further comprises:
    a set of instructions for receiving the selection of the seam; and
    a set of instructions for identifying, in response to the selection of the seam, at least the first and second windows as windows to resize.

8. A non-transitory computer readable medium of claim 1, wherein the set of instructions for resizing the first and second windows comprises a set of instructions for contracting the first window while expanding the second window in response to the selection and the movement of the seam.

9. A non-transitory computer readable medium of claim 8, wherein the set of instructions for contracting the first window and expanding the second window comprises a set of instructions for contracting the first window while expanding the second window in accord with a direction of the movement of the seam.

10. A non-transitory computer readable medium of claim 1, wherein the computer program further comprises a set of instructions for resizing the second window but not the first window in response to a selection and a movement of the first outer edge of the second window when the first outer edges of the first and second windows are in contact.

11. A non-transitory computer readable medium storing a computer program for execution by at least one processor, said computer program comprising:
   a set of instructions for displaying a plurality of windows, each window having a set of outer edges that are individually selectable and movable to resize the window;
   a set of instructions for defining a selectable and movable seam between first and second windows when a first outer edge of a first window is brought into contact with a first outer edge of a second window;
   a set of instructions for extending the seam to include a first outer edge of a third window when the third window is moved to overlap a portion of the first window;
   a set of instructions for concurrently resizing the first, second, and third windows in response to a selection and a movement of the seam; and
   a set of instructions for resizing the first window but not the second and third windows in response to a selection and a movement of the first outer edge of the first window.

12. A non-transitory computer readable medium of claim 11, wherein at least one of the first, second, and third windows includes a display having an aspect ratio, wherein the aspect ratio of the display is maintained when the window is resized in response to the selection and the movement of the seam.

13. A non-transitory computer readable medium of claim 11, wherein at least two of the first, second and third windows have a size ratio relationship with one another, wherein the set of instructions for resizing the first, second, and third windows comprises a set of instructions for resizing the two windows proportionally in order to maintain the size ratio relationship between the two windows.

14. A non-transitory computer readable medium of claim 11, wherein the computer program further comprises:
   a set of instructions for receiving the selection of the seam; and
   a set of instructions for identifying, in response to the selection of the seam, at least the first, second, and third windows as windows to resize.

15. A non-transitory computer readable medium of claim 11, wherein the set of instructions for resizing the first, second, and third windows comprises a set of instructions for contracting the first window while expanding the second window in response to the selection and the movement of the seam.

16. A non-transitory computer readable medium of claim 15, wherein the set of instructions for contracting the first window and expanding the second window comprises a set of instructions for contracting the first window while expanding the second window in accord with a direction of the movement of the seam.

17. A method for resizing windows, said method comprising:
   displaying a plurality of independently resizable windows, said windows comprising first and second abutting windows, said first window having a selectable first outer edge that is in contact with a selectable first outer edge of the second window;
   defining a selectable and movable seam between the first and second windows;
   resizing the first and second windows in response to a selection and a movement of said seam; and
   resizing the first window but not the second window in response to a selection and a movement of the first outer edge of the first window when the first outer edges of the first and second windows are in contact.

18. The method of claim 17 further comprising:
   receiving the selection of the seam; and
   identifying, in response to the selection of the seam, at least the first and second windows as windows to resize.

19. The method of claim 17, wherein resizing the first and second windows comprises contracting the first window while expanding the second window in response to the selection and the movement of the seam.

20. The computer readable medium of claim 19, wherein contracting the first window and expanding the second window comprises contracting the first window while expanding the second window in accord with a direction of the movement of the seam.

21. The method of claim 17, wherein the first window has a predetermined minimum size and a predetermined maximum size, wherein the method further comprises resizing a set of windows that border the first window in response to the selection and the movement of the seam when the first window reaches the predetermined minimum size or the predetermined maximum size.

22. A method of defining a graphical user interface ("GUI"), said method comprising:
   defining a plurality of independently resizable windows, each window having a set of outer edges that are individually selectable and movable to resize the window;
   for resizing multiple windows, defining sets of instructions for (i) defining a selectable and movable seam between first and second windows when a first outer edge of the first window is brought into contact with a first outer edge of the second window, (ii) resizing the first and second windows in response to a selection and a movement of the seam, and (iii) resizing the first window but not the second window in response to a selection and a movement of the first outer edge of the first window when the first outer edges of the first and second windows are in contact.

23. The method of claim 22, wherein the sets of instructions are further for:
   receiving the selection of the seam; and
   identifying, in response to the selection of the seam, at least the first and second windows as windows to resize.

24. The method of claim 22, wherein the set of instructions for resizing the first and second windows comprises a set of instructions for contracting the first window while expanding the second window in response to the selection and the movement of the seam.

25. The method of claim 24, wherein the set of instructions for contracting the first window and expanding the second window comprises a set of instructions for contracting the first window while expanding the second window in accord with a direction of the movement of the seam.

* * * * *